US011570733B2

(12) United States Patent
da Silva et al.

(10) Patent No.: US 11,570,733 B2
(45) Date of Patent: *Jan. 31, 2023

(54) METHOD AND APPARATUS FOR WIRELESS DEVICE SYNCHRONIZATION IN A BEAM-BASED COMMUNICATION SYSTEM

(71) Applicant: Telefonaktiebolaget LM Ericsson (publ), Stockholm (SE)

(72) Inventors: Icaro L. J. da Silva, Solna (SE); Reza Moosavi, Linköping (SE); Pradeepa Ramachandra, Linköping (SE); Henning Wiemann, Aachen (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 90 days.

This patent is subject to a terminal disclaimer.

(21) Appl. No.: 17/157,217

(22) Filed: Jan. 25, 2021

(65) Prior Publication Data
US 2021/0144661 A1    May 13, 2021

Related U.S. Application Data

(63) Continuation of application No. 16/324,699, filed as application No. PCT/EP2017/070503 on Aug. 11, 2017, now Pat. No. 10,932,211.
(Continued)

(51) Int. Cl.
*H04W 16/28* (2009.01)
*H04W 56/00* (2009.01)
(Continued)

(52) U.S. Cl.
CPC ......... *H04W 56/001* (2013.01); *H04W 16/28* (2013.01); *H04W 48/08* (2013.01);
(Continued)

(58) Field of Classification Search
None
See application file for complete search history.

(56) References Cited

U.S. PATENT DOCUMENTS 9,253,782 B2 * 2/2016 Xu ............................ H04L 5/00
10,645,689 B2 * 5/2020 Abedini .............. H04W 56/001
(Continued)

FOREIGN PATENT DOCUMENTS

CN    102710309 A    10/2012
CN    103152816 A    6/2013
(Continued)

OTHER PUBLICATIONS

"Considerations on New Radio Access Mechanisms in NR", 3GPP TSG RAN WG1 Meeting #85, R1-164371, Huawei, HiSilicon, Nanjing, China, May 23-27, 2016, 7 pages.
(Continued)

*Primary Examiner* — Ajit Patel
(74) *Attorney, Agent, or Firm* — Murphy, Bilak & Homiller, PLLC

(57) ABSTRACT

Among other things, the method and apparatus examples herein provide a solution to the problems that arise regarding the need for a wireless device to achieve source synchronization in a beam-based system, where the wireless communication network does not define "cells" for connected-mode wireless devices. The problems relate to how a wireless device can re-synchronize with its source access node in a beam-based system that mainly relies on self-contained transmissions from transmission points in the network. As one example advantage, the contemplated methods and apparatus enable wireless devices to perform measurements to support mobility procedures even when no data transmissions are scheduled.

13 Claims, 9 Drawing Sheets

Related U.S. Application Data

(60) Provisional application No. 62/373,929, filed on Aug. 11, 2016.

(51) Int. Cl.
  *H04W 48/16* (2009.01)
  *H04W 48/08* (2009.01)
  *H04W 48/10* (2009.01)
  *H04W 48/12* (2009.01)

(52) U.S. Cl.
  CPC ........... *H04W 48/16* (2013.01); *H04W 56/00* (2013.01); *H04W 48/10* (2013.01); *H04W 48/12* (2013.01)

(56) References Cited

U.S. PATENT DOCUMENTS

| | | |
|---|---|---|
| 2011/0007717 A1 | 1/2011 | Swarts et al. |
| 2013/0272263 A1 | 10/2013 | Pi et al. |
| 2016/0044517 A1 | 2/2016 | Raghavan et al. |
| 2016/0095074 A1 | 3/2016 | Park et al. |
| 2016/0316465 A1 | 10/2016 | Sahlin et al. |
| 2017/0118665 A1 | 4/2017 | Park et al. |
| 2018/0288753 A1 | 10/2018 | Kishiyama et al. |
| 2018/0294860 A1 | 10/2018 | Hakola et al. |
| 2021/0297961 A1* | 9/2021 | Park .................. H04W 74/08 |

FOREIGN PATENT DOCUMENTS

| | | |
|---|---|---|
| RU | 2406263 C2 | 12/2010 |
| WO | 2015093892 A1 | 6/2015 |
| WO | 2015109153 A1 | 7/2015 |
| WO | 2015167247 A1 | 11/2015 |
| WO | 2016012844 A1 | 1/2016 |
| WO | 2016045529 A1 | 3/2016 |
| WO | 2016086144 A1 | 6/2016 |

OTHER PUBLICATIONS

"Frame Structure Design Considerations for Bands Above 6GHz", 3GPP TSG RAN WG1 Meeting #85, R1-164380, Huawei, HiSilcon, Nanjing, China, May 23-27, 2016, 5 pages.

"Intra-RAT Mobility in NR", 3GPP TSG RAN WG2 Meeting #94, R2-163473, CATT, Nanjing, China, May 23-27, 2016, 6 pages.

"RLF in Rel-13 Low Complexity MTC", 3GPP TSG-RAN WG2 Meeting #92, R2-156814, Samsung, Anaheim, USA, Nov. 16-20, 2015, 4 pages.

"Discussion on RLM for PSCell in dual connectivity", 3GPP TSG-RAN WG1 #85, R1-164121, Intel Corporation, Nanjing, China, May 23-27, 2016, 3 pages.

"Active Mode Mobility in NR; SINR Drops in Higher Frequencies", 3GPP TSG-RAN WG2 #93bis, Tdoc R2-162762, Ericsson, Dubrovnik, Croatia, Apr. 11-15, 2016, 6 pages.

"Agreements in Other Groups and RRM Requirements Impacts", 3GGP TSG RAN WG4 Meeting #79, R4-163337, Ericsson, Nanjing, P.R. of China, May 23-27, 2016, 6 pages.

"Initial Considerations on System Access in NR", 3GPP TSG RAN WG1 Meeting #84, R1-163237, Ericsson, Busan, South Korea, Apr. 11-15, 2016, 5 pages.

"New SID Proposal: Study on New Radio Access Technology", 3GPP TSG RAN Meeting #71 RP-160671 Göteborg, Sweden, Source: NTT Docomo, Mar. 7-10, 2016, pp. 1-8.

"RRM Requirements for New Radio Access Technology", 3GGP TSG-RAN WG4 Meeting #78bis, R4-161726, Ericsson, San Jose del Cabo, Mexico, Apr. 11-15, 2016, 7 pages.

\* cited by examiner

METHOD AND APPARATUS FOR WIRELESS DEVICE SYNCHRONIZATION IN A BEAM-BASED COMMUNICATION SYSTEM

RELATED APPLICATIONS

This application is a continuation of U.S. application Ser. No. 16/324,699, filed 11 Feb. 2019, which is a U.S. National Phase Application of PCT/EP2017/070503, filed 11 Aug. 2017, which claims benefit of U.S. Provisional Application No. 62/373,929, filed 11 Aug. 2016. The entire contents of each aforementioned application is incorporated herein by reference.

TECHNICAL FIELD

The present invention relates to communication systems, such as wireless communication networks, and particularly relates to radio resource management measurements and synchronizing wireless devices in beam-based communication systems.

BACKGROUND

In Long Term Evolution, LTE, a user equipment, UE, can obtain synchronization with one or more transmission points, TPs, of a cell, such as frequency and time synchronization. In one example, time synchronization involves symbol and frame synchronization. Three requirements for frequency and time synchronization in an LTE system include symbol and frame timing, frequency synchronization, and sampling clock synchronization. Symbol and frame timing acquisition involves determining the correct symbol start position. For example, the symbol and frame timing is used to set a Discrete Fourier Transform, DFT, window position. Frequency synchronization is required to reduce or eliminate the effect of frequency errors arising from mismatch of local oscillators between the transmitter and receiver, as well as Doppler shift caused by any UE motion.

Signal sequences used for synchronization can encode a Cyclic Prefix, CP, length, the Physical Cell Identity, PCI, and whether the cell uses Frequency Domain Duplex, FDD, or Time Domain Duplex, TDD. Due to these properties, the sequences that include the PCI may allow the UE to have a clear synchronization reference in the downlink for both "RRC Idle" and "RRC Connected" procedures. In "RRC Idle", for example, synchronization allows the UE to camp on an LTE cell and possibly access this cell by sending a preamble to the Physical Random Access Channel, PRAM, whose configuration has been provided via system information associated with the cell.

A UE can obtain e ency and time synchronization with a cell—provided by a TP—in the downlink by using a Primary Synchronization Signal, PSS, and a Secondary Synchronization Signal, SSS transmitted by the TP. The PSS and SSS structure in time is shown in FIG. 1 for the FDD case and in FIG. 2 for TDD. The TP transmits the synchronization signals periodically, twice per 10 ms radio frame. This arrangement allows the UEs always to be able to synchronize with any radio frame. In an FDD cell—see FIG. 1—the PSS is always located in the last Orthogonal Frequency Division Multiplexing, OFDM, symbol of the first and eleventh time slots of each radio frame, thus enabling the UE to acquire the slot boundary timing independently of the CP length. The SSS is located in the symbol immediately preceding the PSS, a design choice enabling coherent detection of the SSS relative to the PSS, based on the assumption that the channel coherence duration is significantly longer than one OFDM symbol.

In a TDD cell—see FIG. 2—the PSS is located in the third symbol of the 3rd and 13th slots, while the SSS is located three symbols earlier. Coherent detection can be used under the assumption that the channel coherence time is significantly longer than four OFDM symbols. The precise position of the SSS changes depending on the length of the CP configured for the cell. At this stage of the cell detection process, the CP length is not known a priori to the UE, and it is, therefore, blindly detected by checking for the SSS at the two possible positions. While the PSS in a given cell is the same in every subframe in which it is transmitted, the two SSS transmissions in each radio frame change in a specific manner, thus enabling the UE to establish the position of the 10 ms radio frame boundary.

In the frequency domain, the mapping of the PSS and SSS to subcarriers is shown in FIG. 3. The PSS and SSS are transmitted in the central six Resource Blocks, RBs, enabling the frequency mapping of the synchronization signals to be invariant with respect to the system bandwidth, which can in principle vary from 6 to 110 RBs to suit channel bandwidths between around 1.4 MHz and 20 MHz. This arrangement allows the UE to synchronize to the network without any prior knowledge of the allocated bandwidth.

The particular sequences that are transmitted for the PSS and SSS in a given cell are used to indicate the physical layer cell identity, PCI, to the UE. There are 504 unique PCIs in LTE, grouped into 168 groups of three identities. The three identities in a group would usually be assigned to cells under the control of the same eNodeB. Three PSS sequences are used to indicate the cell identity within the group, and 168 SSS sequences are used to indicate the identity of the group.

A study item for the new 5G radio access technology, entitled New Radio or NR, has been started in 3GPP. This study involves the following design principles: ultra-lean design in the new 5G radio access technology denoted as NR; self-contained transmissions; massive usage of beamforming; and decoupling between Idle and Connected connectivity.

NR is envisioned to be an ultra-lean system that implies the minimization of "always-on" transmissions, aiming for an energy efficient system that can account for future, developments. For example, in RAN1#84bis, the RAN1 group agreed that, regarding ultra-lean design, the NR shall strive for maximizing the amount of time and frequency resources that can be flexibly utilized or that can be left blank without causing backward compatibility issues in the future, where blank resources can be used for future use. Further agreed was that NR shall strive for minimizing transmission of always-on signals, and confining signals and channels for physical layer functionalities—e.g., signals, channels, signaling—within a configurable/allocable time/frequency resource.

As mentioned for LTE, PSS and SSS are the main time/frequency synchronization enablers. They are classified as always-on signals transmitted twice in every 10 ms radio frame. Therefore, a lean system should account for the need of synchronization sequences.

In LTE, a UE relies on PSS and SSS to synchronize with a given cell and such signals encode the PCI. The UE derives Cell-Specific Reference Signals, CRS, used to perform Radio Resource Management (RRM) measurements, e.g., to support DL-based mobility, and channel estimation associated with that same PCI.

In NR, instead of relying on cell specific signals, such as PSS/SSS and CRS, "self-contained" transmissions are envisioned. Self-contained transmissions means that all channels contain their own synchronization sequences. The use of self-contained transmissions could be done so that a NR TP is ultra-lean to the point of not transmitting any signal, not even for synchronization purposes unless there is an ongoing data transmission or one that is scheduled. In this case, the UE obtains synchronization and decodes data in the same subframe/time slot.

The limitation brought by self-contained transmissions is that there will be periods where the UE has no data scheduled while it moves, so that when the UE checks PDCCH availability, or the availability of any other channel, and their self-contained signals, the UE is not able to re-synchronize because it has poor coverage. At the same time, there will be beams that would cover the UE much better, for example, because the UE got closer to another TP or access node. Therefore, the UE needs to perform some kind of radio link monitoring while it is not transmitting data, to perform measurements, send measurement reports and eventually enable the network to trigger a mobility procedure or some type of beam management. Otherwise, the alternative would be some kind of Radio Link Failure, RLF, declaration, followed by an attempt to re-establish the connection. That approach may significantly increase the delay until the UE can transmit data again, especially considering the lean design and the contemplated low periodicity of signals transmitted for Idle UEs.

Also, there is a common understanding that NR will consider frequency ranges up to 100 GHz. In comparison to the current frequency bands allocated to LTE, some of the new bands will have much more challenging propagation properties, such as lower diffraction and higher outdoor/indoor penetration losses. Consequently, signals will have less ability to propagate around corners and penetrate walls. Also, in high-frequency bands, atmospheric/rain attenuation and higher body losses render the coverage of NR signals even spottier. Fortunately, the operation in higher frequencies makes it possible to use smaller antenna elements, which enables antenna arrays with many antenna elements. Such antenna arrays facilitate beamforming, where multiple antenna elements are used to form narrow beams and thereby compensate for the challenging propagation properties. For these reasons, it is widely accepted that NR will massively rely on antenna beamforming to provide coverage, which may cause some to call it a beam-based system. For example, a NR TP performs antenna beamforming to form directional beams having corresponding, possibly overlapping coverage areas.

In addition, different antenna architectures should be supported, including analog, hybrid and digital. Such support implies some limitations regarding how many directions can be covered simultaneously, especially in the case of analog/hybrid beamforming. To find a good beam direction at a given TP, also referred to as a Transmission Reception Point or TRP, access node or antenna array, a beam-sweep procedure is typically employed. A typical example of a beam-sweep procedure involves the node pointing a beam containing a synchronization signal and/or a beam identification signal, in each possible direction, one or a few directions at a time. FIG. 4 illustrates an example of beam sweeping.

A NR Cell to be discovered and used by Idle UEs may be defined by a Cell Identifier, e.g., PCI, possibly encoded by a set of synchronization sequences like a PSS and a SSS from which the UE gets synchronization. Based on the Cell Identifier, the UE is able to obtain system information and learns how to access the system. Note: Idle in this context refers to the RRC Idle state but the concept extends to any kind of sleeping state where the UE is optimized for battery savings. In LTE for example, Idle comprises procedures such as Suspend/Resume. Early discussions about the NR state model referred to a new state called "RRC Connected Inactive" and that term has found some usage.

However, it is recognized and appreciated herein that a NR Cell may not need to be defined for Connected mode UEs. Instead, the UEs may switch across multiple beams, and Cell Identifiers are not derived from previously acquired information, such as the Cell ID in LTE. Such an approach directly impacts synchronization procedures.

It is recognized herein that source synchronization is not defined for a UE in a beam-based system where "cells" as traditionally understood are not used, at least for UEs in connected mode. This problem relates to how the UE can re-synchronize with its source access node/TP in a beam-based system, mainly relying on self-contained transmissions. The UE should be able to perform measurements to support mobility procedures even when no data is scheduled.

SUMMARY

Among other things, the method and apparatus examples herein provide a solution to the problems that arise regarding the need for a wireless device to achieve source synchronization in a beam-based system where the communication network does not define "cells" for connected-mode wireless devices. The problems relate to how a wireless device can re-synchronize with its source access node in a beam-based system that mainly relies on self-contained transmissions. As one example advantage, the contemplated methods and apparatus enable wireless devices to perform measurements to support mobility procedures even when no data transmissions are scheduled.

In one embodiment, an access point, also referred to as a transmission point, transmits one or more sets of synchronization sequences to be used by wireless devices as their synchronization source, e.g., for time and frequency synchronization in the downlink. In a corresponding embodiment, a wireless device operating within the relevant coverage area(s) uses any of these sequences as its synchronization source. The synchronization signals can be beamformed in narrow beams or wider beams.

As an advantage of such operation, the wireless device can maintain its synchronization when moving across the coverage areas of different beams, where different synchronization signals are being transmitted for each beam. For example, the synchronization signal transmitted for each beam s based on a different sequence.

This disclosure also presents method and apparatus details for wireless devices and the network to obtain or determine the synchronization sequences in use by respective transmission points, and for updating such information to support mobility, beam configuration changes, etc.

Further, in at least one embodiment, the different synchronization signals transmitted by a transmission point are different Mobility Reference Signals (MRS). Each MRS comprises a Time Synchronization Sequence (TSS) and Beam Reference Signal (BRS). Thus, a transmission point is configured with a set of with each MRS corresponding to a beam, such that the set of MRSs transmitted by the transmission point enables a wireless device to use the transmission point as a synchronization source.

The availability of multiple sets of synchronization sequences/MRSs allows wireless devices to re-gain synchronization even when the device cannot decode downlink control channels, or suffers from other types of radio link problems.

With the above in mind, in one or more embodiments, a transmission point is configured for operation in a wireless communication network. The transmission point comprises transceiver circuitry and associated processing circuitry operative to transmit two or more synchronization signals from the transmission point. Respective ones of the synchronization signals correspond to different beams from among two or more beams used by the transmission point in antenna beamforming. In an example, the transmission point is configured to use a set of synchronization sequences, where it will be understood that each synchronization signal is based on a different one of the sequences. The synchronization signals serve as references for synchronization measurements by wireless devices, for obtaining or maintaining synchronization with the transmission point.

In at least some embodiments, a wireless device is configured for operation in a wireless communication network. The wireless device comprises transceiver circuitry operatively associated processing circuitry configured to determine the synchronization signals used by a transmission point of the wireless communication network. More particularly, the synchronization signals comprise two or more synchronization signals, and the transmission point uses a different synchronization signal for each of two or more beams used by the transmission point in antenna beamforming. The wireless device synchronizes to the transmission point based on receiving one or more of the synchronization signals transmitted by the transmission point.

Further aspects of the present invention are directed to an apparatus, computer program products or computer readable storage medium corresponding to the methods summarized above and functional implementations of the above-summarized apparatus and wireless device.

Of course, the present invention is not limited to the above features and advantages. Those of ordinary skill in the art will recognize additional features and advantages upon reading the following detailed description, and upon viewing the accompanying drawings.

In one embodiment a method implemented by a transmission point configured for operation in a wireless communication network is provided. The method comprises transmitting two or more synchronization signals from the transmission point on a beam-specific basis, such that each synchronization signal corresponds to a respective one among two or more beams used by the transmission point in antenna beamforming. The synchronization signals serve as references for synchronization measurements by wireless devices, for obtaining or maintaining synchronization with the transmission point. This provides the advantage that a wireless device can maintain synchronisation with a transmission point whilst it moves across directional beams transmitted by the transmission point by detecting alternative synchronisation signals to which it can use for synchronisation as it moves into the path of the beam.

In a further aspect, the method comprises transmitting information from the transmission point to enable the wireless device to determine the two or more synchronization signals as belonging to a set of synchronisation signals.

In another aspect the method includes transmitting downlink signals using the two or more directional beams.

In another aspect the method includes generating the two or more synchronization signals wherein the generating includes differentiating the two or more synchronization signals in terms of included information or signal properties, thereby enabling a receiving wireless device to distinguish between the two or more synchronization signals.

In some aspects, the transmission point generates two or more synchronization signals, each synchronization signal being distinguishable from the other one or ones of the two or more synchronization signals.

In another aspect the two or more synchronization signals comprise a set of Mobility Reference Signals, MRSs, each MRS comprising a Time Synchronization Signal, TSS, and a Beam Reference Signal, BRS, and each BRS being unique within the set of MRSs, and further wherein each MRS is associated with a different one of the two or more directional beams used by the transmission point in antenna beamforming.

In another aspect, the method further comprises transmitting the two or more synchronization signals according to a beam-sweeping pattern.

In another aspect, the method further comprises adapting the transmission of at least one synchronization signal for the corresponding directional beam in dependence on at least one of: radio link conditions between the transmission point and one or more wireless devices that are operating in a coverage area of the corresponding directional beam; and a monitored synchronization quality of one or more wireless devices operating in the coverage area of the corresponding directional beam.

In another aspect the method further comprises receiving signaling from another node in the wireless communication network, specifying the two or more synchronization signals to be generated and transmitted.

In another aspect the method further comprises, for one or more of the directional beams, dynamically determining at the transmission point which downlink resources to use for transmitting the corresponding synchronization signal.

In another aspect, the method further comprises transmitting assistance information from the transmission point, the assistance information identifying the two or more synchronization signals, or otherwise providing information needed for wireless devices to detect or identify the two or more synchronization signals.

In another aspect the method further comprises dynamically changing the number of directional beams used by the transmission point in antenna beamforming and correspondingly changing the number of synchronization signals in use by the transmission point, such that the transmission point transmits a different synchronization signal for each directional beam.

In another embodiment a transmission point is configured for operation in a wireless communication network, the transmission point comprising transceiver circuitry and processing circuitry operative to transmit, via the transceiver circuitry, two or more synchronization signals from the transmission point on a beam-specific basis, such that each synchronization signal corresponds to a respective one among two or more directional beams used by the transmission point in antenna beamforming. The synchronization signals serve as references for synchronization measurements by wireless devices, for obtaining or maintaining synchronization with the transmission point.

In another embodiment a method of operation by a wireless device configured for operation in a wireless communication network is provided. The method comprises determining a set of synchronization signals used by a transmission point in the wireless communication network and maintaining synchronization with the transmission point in conjunction with moving between coverage areas corresponding to the two or more directional beams, based on detected ones of the synchronization signals in the set. This provides the advantage that the wireless device avoids performing new synchronization procedures with the transmission point when it enters the coverage of a new beam, since the beams are determined to belong to the same transmission point.

In another aspect the determining the set of synchronization signals comprises receiving assistance information that identifies the set of synchronization signals, or provides information enabling the wireless device to identify the set of synchronization signals.

In another aspect the transmission point comprises a first one of neighboring first and second transmission points in the wireless communication network. The method further comprises detecting one or more synchronization signals comprising a set determined to be associated with the second transmission point, and changing over from using the first transmission point as the synchronization source for the wireless device to using the second transmission point as the synchronization source for the wireless device, based on determining that a radio quality determined by the wireless device for one or more synchronization signals detected from the second transmission point is higher than a radio quality determined by the wireless device for any detected synchronization signal from the first transmission point.

In another aspect, the method further comprises determining, based on receiving information from the wireless communication network, the downlink resources used for transmitting each synchronization signal for the corresponding directional beam.

In another apsect, maintaining synchronization with the transmission point comprises, in instances where two or more of the synchronization signals in the set of synchronization signals are detected by the wireless device, selecting a strongest or highest-quality one of the t or re detected synchronization signals, for use in maintaining synchronization with the transmission point.

In another embodiment a wireless device is configured for operation in a wireless communication network. The wireless device (50) comprises transceiver circuitry for receiving signals from transmission points (30) in the wireless communication network and processing circuitry operatively associated with the transceiver circuitry and configured to determine a set of synchronization signals used by a transmission point and maintain synchronization with the transmission point in conjunction with moving between coverage areas corresponding to the two or more directional beams, based on dynamically synchronizing or resynchronizing with detected ones of the synchronization signals in the set.

In another embodiment a computer program product comprises computer instructions that, when executed on at least one processing circuit of a transmission point configured for operation in a wireless communication network, cause the transmission point to transmit two or more synchronization signals from the transmission point on a beam-specific basis, such that each synchronization signal corresponds to a respective one among two or more directional beams used by the transmission point (30) in antenna beamforming. The synchronization signals serve as references for synchronization measurements by wireless devices, for obtaining or maintaining synchronization with the transmission point.

In another embodiment a computer program product comprises computer instructions that, e executed on at least one processing circuit of a wireless device configured for operation in a wireless communication network, cause the wireless device to determine a set of synchronization signals used by a transmission point and maintain synchronization with the wireless communication network in conjunction with moving between coverage areas corresponding to the two or more directional beams, based on dynamically synchronizing or resynchronizing with detected ones of the synchronization signals in the set.

In another embodiment a transmission point is configured for operation in a wireless communication network and comprises a transmitting module and a processing module configured to transmit, via the transmitting module, the two or more synchronization signals from the transmission point on a beam-specific basis, such that each synchronization signal corresponds to a respective one among two or more directional beams used by the transmission point in antenna beamformin. The synchronization signals serve as references for synchronization measurements by wireless devices, for obtaining or maintaining synchronization with the transmission point.

In another embodiment a wireless device is configured for operation in a wireless communication network and comprising a receiving module configured to receive signals from a transmission point in the wireless communication network and a processing module configured to determine a set of synchronization signals used by the transmission point and maintain synchronization with the transmission point in conjunction with moving between coverage areas corresponding to the two or more directional beams, by dynamically synchronizing or resynchronizing with detected ones of the synchronization signals in the set.

DETAILED DESCRIPTION

Figure 1:
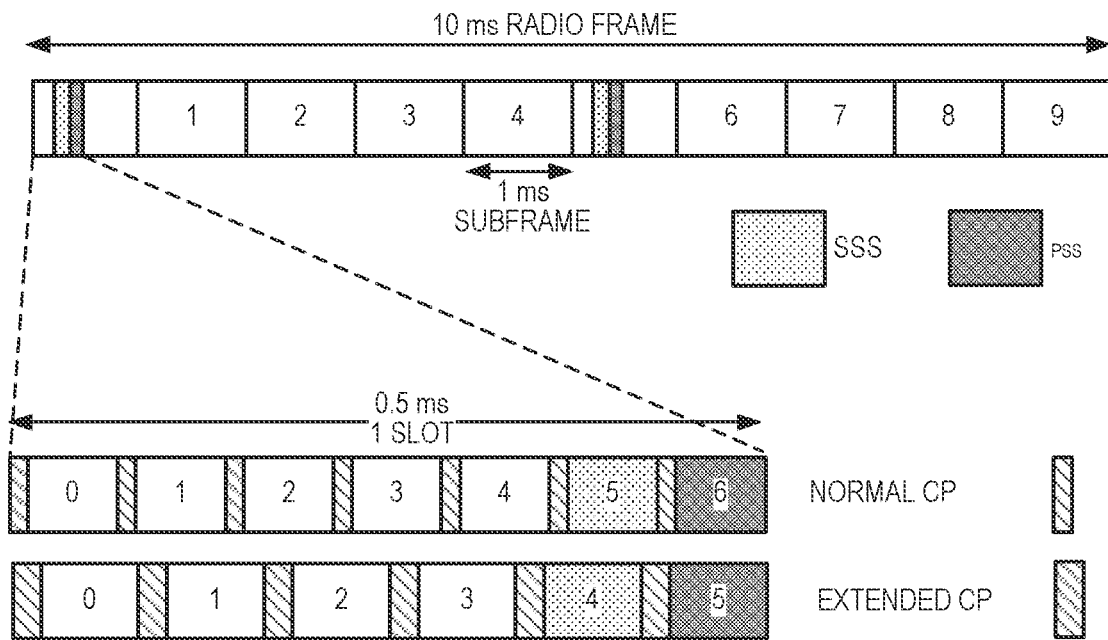
FIG. 1 is a diagram illustrating PSS and SS frame and slot structure in the time domain in the FDD case.
Figure 2:
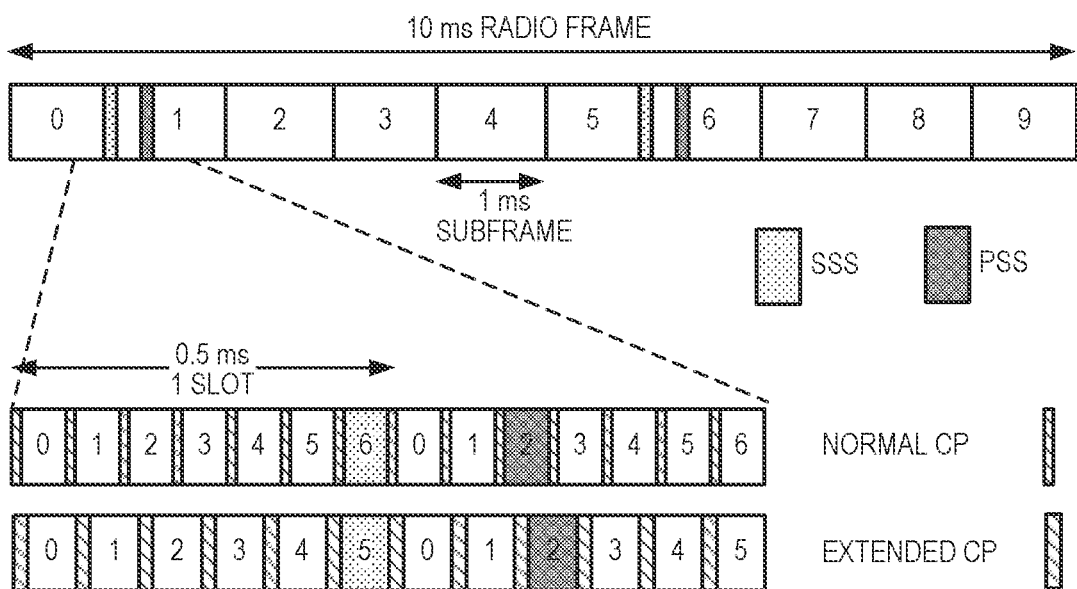
FIG. 2 is a diagram illustrating PSS and SS frame and slot structure in the time domain in the TDD case.
Figure 3:
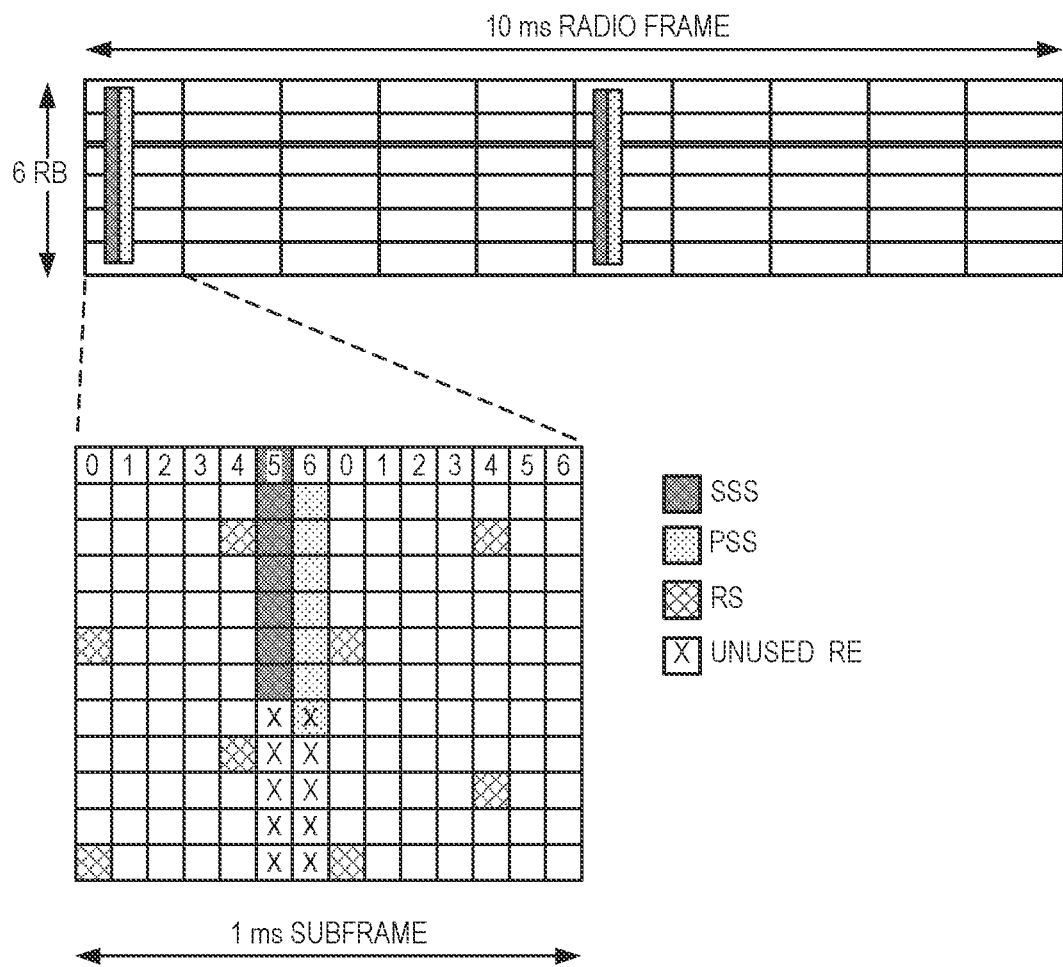
FIG. 3 is a diagram illustrating PSS and SSS frame structure in frequency and time domain for an FDD cell.
Figure 4:
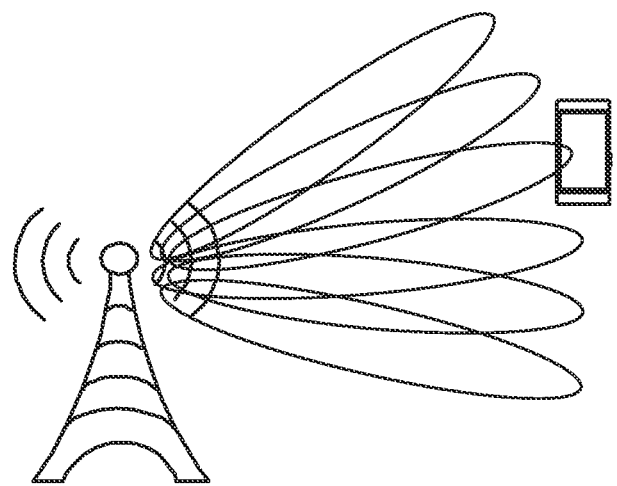
FIG. 4 is a diagram illustrating a beam sweeping procedure.

It is recognized and appreciated herein that by having the same coverage properties of a synchronization signal and a beam identification signal, a wireless device could not only synchronize to a transmission point, but also gain the best heaps knowledge at a givers location. Further, it is appreciated herein that, concerning synchronization acquisition, the transmitted synchronization signal in the downlink (if at all available) might happen in a beam-sweep manner, and thus a wireless device might be able to hear several synchronization signals all belonging to the same node.

In an example embodiment, a transmission point transmits two or more synchronization signals, e.g., it transmits a set of synchronization signals. Here, the transmission point comprises, e.g., a network access node. Further, transmitting two or more synchronization signals should be understood as referring in a general sense to the transmission two or more synchronization signals that are distinguishable, e.g., one based on a first sequence and one based on a second sequence. It should also be understood that "transmitting" the two or more synchronization signals may include transmitting them at multiple times, e.g., in any number of recurring frames or subframes. Further, transmitting the two or more synchronization signals may mean transmitting them at the same times, or at different times, etc.

These synchronization signals may include synchronization sequences, such as PSS/SSS or Mobility Reference Signals, MRSs. MRSs may refer to signals that are transmitted in a wireless network and that are specifically designated for measurements by wireless devices, where the measurements are for use in mobility procedures, e.g., handovers from one node to another or from one beam to another. Sometimes, an MRS may also be referred to as a Measurement Reference Signal. MRSs may include a Time Synchronization Sequence, TSS, and a Beam Reference Signal, MRS. A set of synchronization signals may include a pair of sequences, such as the TSS and the BRS. In other words, "multiple sets of synchronization sequences" can be interpreted as "multiple MRSs". A set of MRSs may be used as the synchronization source for a given user equipment, UE. Note that "UE" and "wireless device" may be considered as interchangeable terms unless otherwise noted.

An MRS set may also refer to a set of parameters that defines the physical resources occupied by a transmitted MRS, i.e., the time-frequency and/or code resources, and/or that defines a signal sequence, such as a sequence of symbol values that make up the MRS. Thus, for example, different MRS sets may specify different time-frequency resources for different MRSs, such as different patterns of resource elements in an Orthogonal Frequency-Division Multiplexing (OFDM) time-frequency grid. Different MRS sets may instead or additionally specify different sequences of symbol values, for example.

According to various embodiments, one or more sets of signals may be received by wireless devices under the coverage area of a transmission point, which may be an access node, and used for various purposes, such as for synchronization or RRM measurements. For example, a set of signals may be a set of synchronization signals, where a different synchronization signal belongs to each of two or more directional beams used by a transmission point, each directional beam covering a respective portion of a coverage area of the transmission point for downlink service. A wireless device that receives the signal set, or multiple signal sets, may be able to autonomously determine to use the signal set as its synchronization source for time and frequency synchronization in the downlink. For example, the synchronization signals of a received signal set can be used, among other information, to keep a wireless device synchronized when it moves across the coverage of different sets of sequences being transmitted by the same transmission point or access node. There is no need to trigger any error case or failure procedure, such as Radio Link Failure, as long as any of these sets can be detected and synchronization can be obtained from them.

Figure 5A:
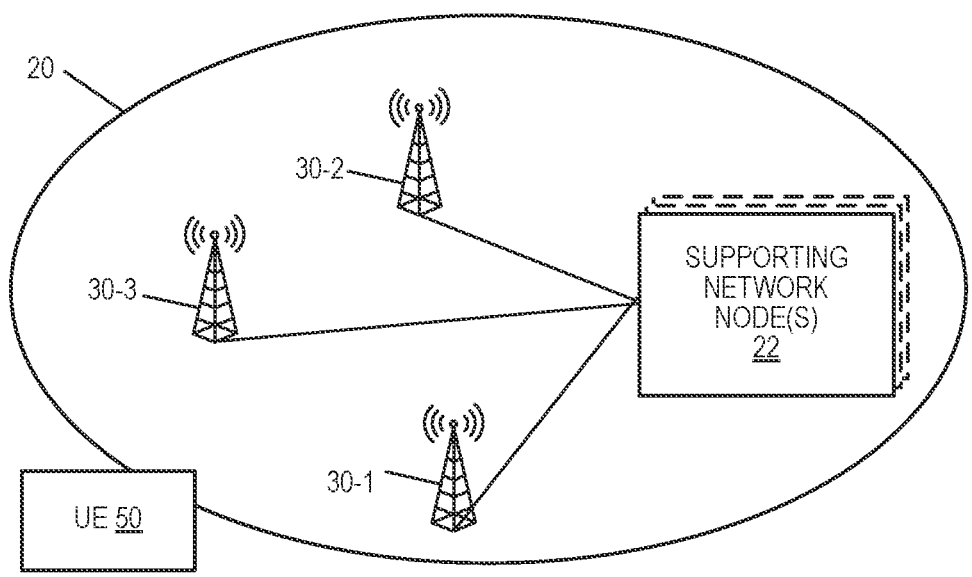
FIG. 5A is a diagram illustrating an example wireless communication network, including one or more transmission points.
Figure 5B:
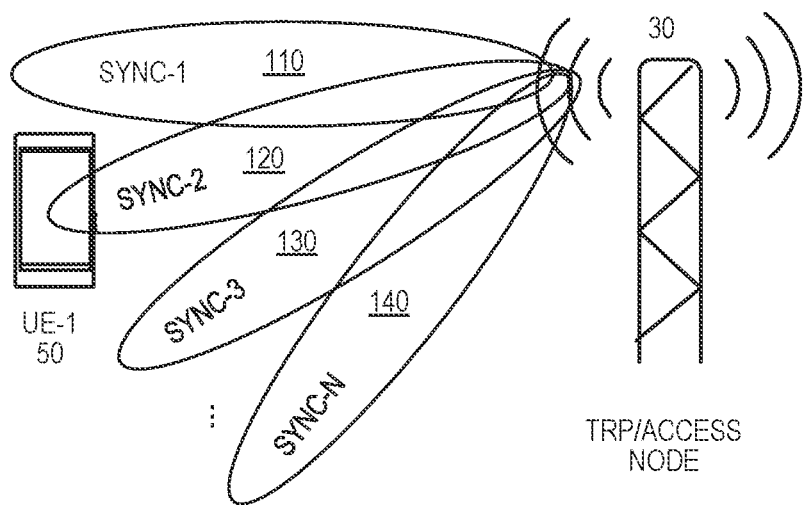
FIG. 5B is a diagram illustrating one embodiment of transmitting multiple synchronization sequences from a transmission point, for use by a wireless device.

FIGS. 5A and 5B illustrate example arrangements contemplated herein. Particularly, FIG. 5A illustrates an example wireless communication network 20, which includes one or more supporting nodes 22 e.g., operations nodes, gateway nodes, etc. that provide support for several transmission points 30 that provide radio access to the network 20. Three transmission points 30 appear in the diagram, including transmission points 30-1, 30-2, and 30-3. While referred to as "transmission points", it will be appreciated that each transmission point 30 may operate as an access point, base station, etc., providing for both downlink transmissions to wireless devices operating in the network 20 and reception of uplink transmissions from such devices. For simplicity, only one example wireless device 50 appears in the figure denoted as "UE 50"—and it will be appreciated that the wireless device 50 may move in or among the radio coverage areas associated with the respective transmission points 30.

In that regard, each transmission point 30 in FIG. 5A operates as a beamforming transmission point, wherein uses two or more directional beams, with each hearer providing radio coverage in a corresponding coverage area. Of course, the beam-to-beam coverage areas may overlap, and the transmission point 30 may dynamically adjust any one or more of the beam size, beam shape, and beam count.

FIG. 5B illustrates one example of beamforming by a transmission point 30, where the transmission of multiple synchronization signals by the transmission point 30 is to be used by a wireless device 50 as its synchronization source for time and frequency synchronization in the downlink. The multiple synchronization signals 110, 120, 130 and 140 can be beamformed in narrow bearers or wider beams. Provided the wireless device 50 can detect any of these signals, the wireless device 50 can consider itself synchronized with the source access node or transmission point. In some cases, sets of signals can be used for update procedures, such as in the case of mobility and/or parameter optimization.

In the context of FIG. 5B, the synchronization signal 110 can be understood as being a first synchronization sequence from a defined set of synchronization sequences, with the synchronization signal 120 being a second synchronization sequence from the set, and so on.

Figure 6:
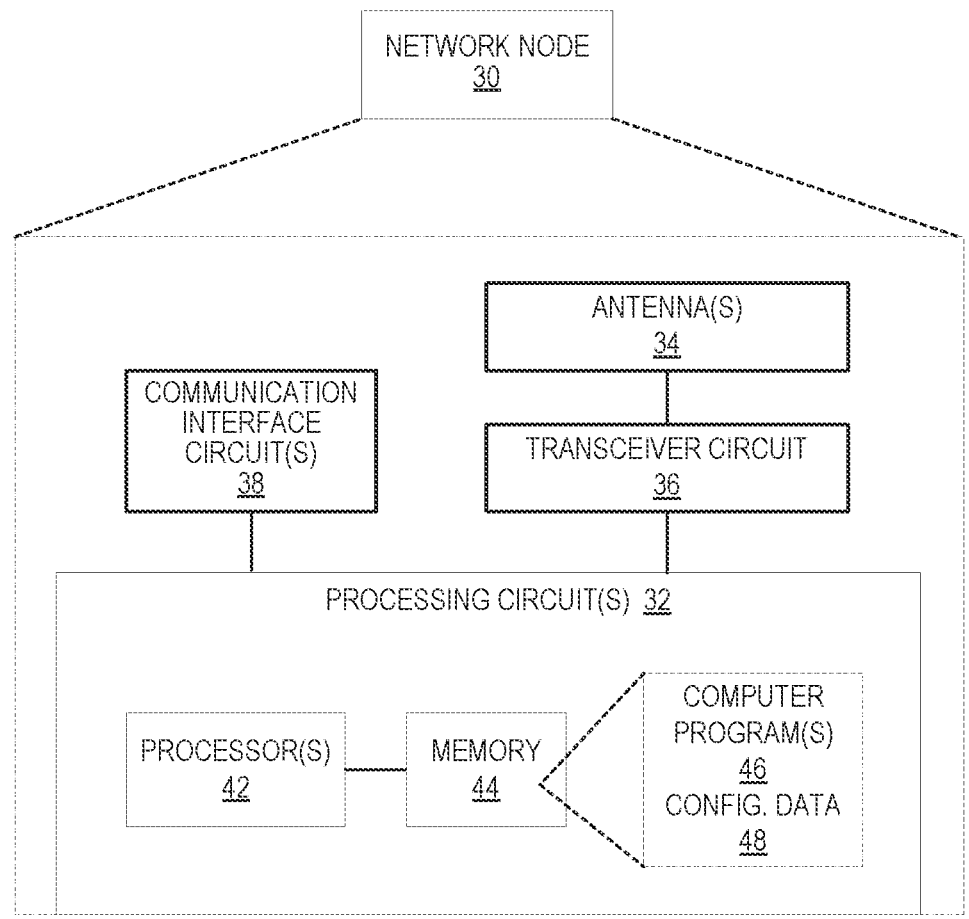
FIG. 6 is a block diagram of a network node, according to some embodiments.

FIG. 6 illustrates an example transmission point 30 in more detail, but it should be understood that the transmission point 30 may be implemented differently. Further, the transmission point 30 should be understood as being an example of a radio network node, such as an access point, base station, eNodeB, gNB, or another transceiver. Still further, at least some of the functionality attributed to the transmission point 30 may be distributed across more than one node, e.g., at least some functionality may be performed by other nodes in the radio network, or in an associated core network, or may be cloud-based.

The transmission point 30, also referred to as the network node 30, includes a communication interface circuit 38 that includes circuitry for communicating with other network nodes 22. The network node 30 communicates with wireless devices 50 operating in the network via antennas 34 and transceiver circuitry 36. The antenna(s) 34 comprises, for example, an array of antenna elements and the transceiver circuitry 36 is configured to perform beamforming using the antenna array.

Broadly, the transceiver circuitry 36 may include transmitter circuitry, receiver circuitry, and associated control circuits that are collectively configured to transmit and receive signals according to one or more radio access technologies, for the purposes of providing communication services, at least to wireless devices 50 operating in the coverage area(s) associated with the network node 30. For example, the network node 30 is configured as an NR node providing radio access in an NR network.

The network node 30 also includes processing circuitry 32 that is operatively associated with the communication interface circuit 38 and transceiver circuitry 36. The network node 30 uses the communication interface circuit 38 to communicate with other network nodes 22 and the transceiver circuit 36 to communicate with wireless devices 50. By way of example, the processing circuitry 32 comprises one or more digital processors 42, e.g., one or more microprocessors, microcontrollers, Digital Signal Processors (DSPs), Field Programmable Gate Arrays (FPGAs), Complex Programmable Logic Devices (CPLDs), Application Specific Integrated Circuits (ASICs), or any mix thereof. More generally, the processing circuitry 32 may comprise fixed circuitry, or programmable circuitry that is specially configured via the execution of program instructions implementing the functionality taught herein, or may comprise some mix of fixed and programmed circuitry.

In the illustrated embodiment, the processing circuitry 32 includes a memory 44. The memory 44, in some embodiments, stores one or more computer programs 46 and, optionally, configuration data 48. The memory 44 provides non-transitory storage for the computer program 46, and it may comprise one or more types of computer-readable media, such as disk storage, solid-state memory storage, or any mix thereof. By way of non-limiting example, the memory 44 comprises any one or more of SRAM, DRAM, EEPROM, and FLASH memory, which may be in the processing circuitry 32 and/or separate from the processing circuitry 32.

In general, the memory 44 comprises one or more types of computer-readable storage media providing non-transitory storage of the computer program 46 and any configuration data. 48 used by the network node 30. Here, "non-transitory" means permanent, semi-permanent, or at least temporarily persistent storage and encompasses both long-term storage in non-volatile memory and storage in working memory, e.g., for program execution.

In some embodiments, the processor(s) 42 of the processing circuitry 32 may execute a computer program 46 stored in the memory 44 that configures the processor(s) 42 to control the transmitting circuitry of the transceiver circuit 36 to transmit a different synchronization signal for each of two or more beams used by the network node 30 in antenna beamforming. Each such beam covers, for example, a respective portion of the overall coverage area of the network node 30. The synchronization signal transmitted for each directional beam belongs to a set of synchronization signals associated with the network node 30 and enables wireless devices 50 operating in the coverage area(s) of the network node 30 to synchronize with the wireless communication network 20 via the network node 30. The synchronization signals also may have properties that allow them to be used by wireless devices 50 as reference signals for making received signal strength or quality or other radio measurements.

In some embodiments the processing circuitry 32 is configured to transmit, via the transceiver circuitry 36, two or more synchronization signals from the network node 30 on a beam-specific basis, such that each synchronization signal corresponds to a respective one among two or more directional beams used by the transmission point in a a beamforming. The synchronization signals serve as references for synchronization measurements by wireless devices 50, for obtaining or maintaining synchronization with the network node 30.

In some embodiments the processing circuitry 32 of the network node 30 is configured to generate two or more synchronization signals, each synchronization signal being distinguishable from the other one or ones of the two or more synchronization signals. Further, the processing circuitry 32 is configured to transmit, via the transceiver circuitry 36, the two or more synchronization signals from the network node 30 on a beam-specific basis, such that each synchronization signal corresponds to a respective one among two or more directional beams used by the transmission point in antenna beamforming. The synchronization signals serve as references for synchronization measurements by wireless devices 50, for obtaining or maintaining synchronization with the network node 30.

In some embodiments the processing circuitry 32 of the network node 30 is configured to generate two or more synchronization signals, wherein each synchronization signal belongs to a set of synchronization signals associated with the transmission point. Further, the processing circuitry 32 is configured to transmit, via the transceiver circuitry 36, the two or more synchronization signals from the network node 30 on a beam-specific basis, such that each synchronization signal corresponds to a respective one among two or more directional beams used by the transmission point in antenna beamforming. The synchronization signals serve as references for synchronization measurements by wireless devices 50, for obtaining or maintaining synchronization with the network node 30. In further example details, the processing circuitry 32 is configured to transmit downlink signals using the two or more directional beams. In the same or in other embodiments, the processing circuitry 32 is configured to differentiate the two or more synchronization signals in terms of included information or signal properties, thereby enabling a receiving wireless device 50 to distinguish between the two or more synchronization signals.

The two or more synchronization signals comprise, for example, a set of Mobility Reference Signals, MRSs. In turn, each MRS comprises a Time Synchronization Signal, TSS, and a Beam Reference Signal, BRS, and each BRS being unique within the set of MRSs. Further, each MRS is associated with a different one of the two or more directional beams used by the transmission point in antenna beamforming.

Further, in one or more embodiments, the processing circuitry 32 is configured to transmit the two or more synchronization signals according to a beam-sweeping pattern. In the same embodiments i, or in still further embodiments, the processing circuitry 32 is configured to adapt the transmission of at least one synchronization signal for the corresponding directional beam in dependence on at least one of: radio link conditions between the transmission point and one or more wireless devices 50 that are operating in a coverage area of the corresponding directional beam, a monitored synchronization quality of one or more wireless devices 50 operating in the coverage area of the corresponding directional beam.

The processing circuitry 32 is further configured in at least some embodiments to receive signaling from another node in the wireless communication network 20—e.g., from a supporting node 22—where such signaling indicates the two or more synchronization signals to be generated and transmitted. Still further, in at least some embodiments, the processing circuitry 32 is configured to dynamically determine which downlink resources to use for transmitting the corresponding synchronization signal for one or more of the directional beams, The processing circuitry 32 may also be configured to transmit assistance information from the network node 30. The assistance information identifies the two or more synchronization signals, car otherwise provides information needed for wireless devices 50 to detect or identify the two or more synchronization signals. Still further, the processing circuitry 32 may be configured to dynamically change the number of directional beams used by the network node 30 in antenna beamforming and correspondingly change the number of synchronization signals in use by the network node 30, such that the network node 30 transmits a different synchronization signal for each directional beam, More generally, a network node 30 may carry out a method or methods of operation embodying any of the above functionality described for the network node 30, without being restricted to the implementation details illustrated in the example of FIG. 6. Correspondingly, 7 illustrates an example method 700 performed by a network node 30, The method 700 includes generating (Block 702) two or more synchronization signals, each synchronization signal being distinguishable from the other one or ones of the two or more synchronization signals, and transmitting (Block 704) the two or more synchronization signals from the transmission point on a beam-specific basis, such that each synchronization signal corresponds to a respective one among two or more directional beams used by the transmission point in antenna beamforming. Here, the synchronization signals serve as references for synchronization measurements by wireless devices 50, for obtaining or maintaining synchronization with the transmission point 30.

The method (700) may include generating (702) two or more synchronization signals, wherein each synchronization signal belongs to a set of synchronization signals associated with the transmission point and transmitting (704) the two or more synchronization signals from the transmission point (30) on a beam-specific basis, such that each synchronization signal corresponds to a respective one among two or more directional beams used by the transmission point (30) in antenna beamforming; wherein the synchronization signals serve as references for synchronization measurements by wireless devices (50), for obtaining or maintaining synchronization with the transmission point (30). As suggested above, the method 700 may include further operations, such as transmitting assistance information identifying the two or more synchronization signals, e.g., identifying the set of synchronization signals being used by the network node 30 for the involved set of directional beams. The method 700 may also include transmitting the synchronization signals according to a beam-sweeping pattern. Still further, the method 700 include adapting the transmission of at least one synchronization signal for the corresponding directional beam in dependence on at least one of: radio link conditions between the network node 30 and one or more wireless devices 50 that are operating in a coverage area of the corresponding directional beam, a monitored synchronization quality of one or more wireless devices 50 operating in the coverage area of the corresponding directional beam.

Also as noted, the two or more synchronization signals may comprise a set of Mobility Reference Signals, MRSs. As before, each MRS may comprise a Time Synchronization Signal (TSS) and a Beam Reference Signal, BRS. Each BRS is unique within the set of MRSs, and each MRS is associated with a different beam used by the transmission point 30 for antenna beamforming.

Further, there may be beamforming solutions where different sets of beams are used to provide coverage for an overall coverage area. For example, there could be beam widths of different granularity within the same overall coverage area. A particular set of beams can be used at different times depending on what type of wireless devices 50 are in the overall coverage area. Any presence of slow moving distant wireless devices 50 might involve a configuration with a couple of narrow beams as a fall back synchronization source for such devices. If there are many wireless devices 50 in the coverage area, then the network node 30—or multiple, coordinating nodes 30—might be configured to provide the wireless devices 50 with a few common wide area beams as synchronization sources. Basically, the involved beamformers—network node or nodes 30—may be configured with the flexibility to determine what type of beamforming is used to provide synchronization coverage. For instance, at different tunes, different beams might be providing the coverage in an overall coverage area, depending on the current population of the active wireless devices in the overall coverage area.

The multiple, beam-specific synchronization signals transmitted by a given network node 30 may be distinguished by wireless device 50 based on, for example different identification information being included in the synchronization signals. In further refinements, synchronization signals may be device-specific, or specific to a group of wireless devices 50.

Figure 8:
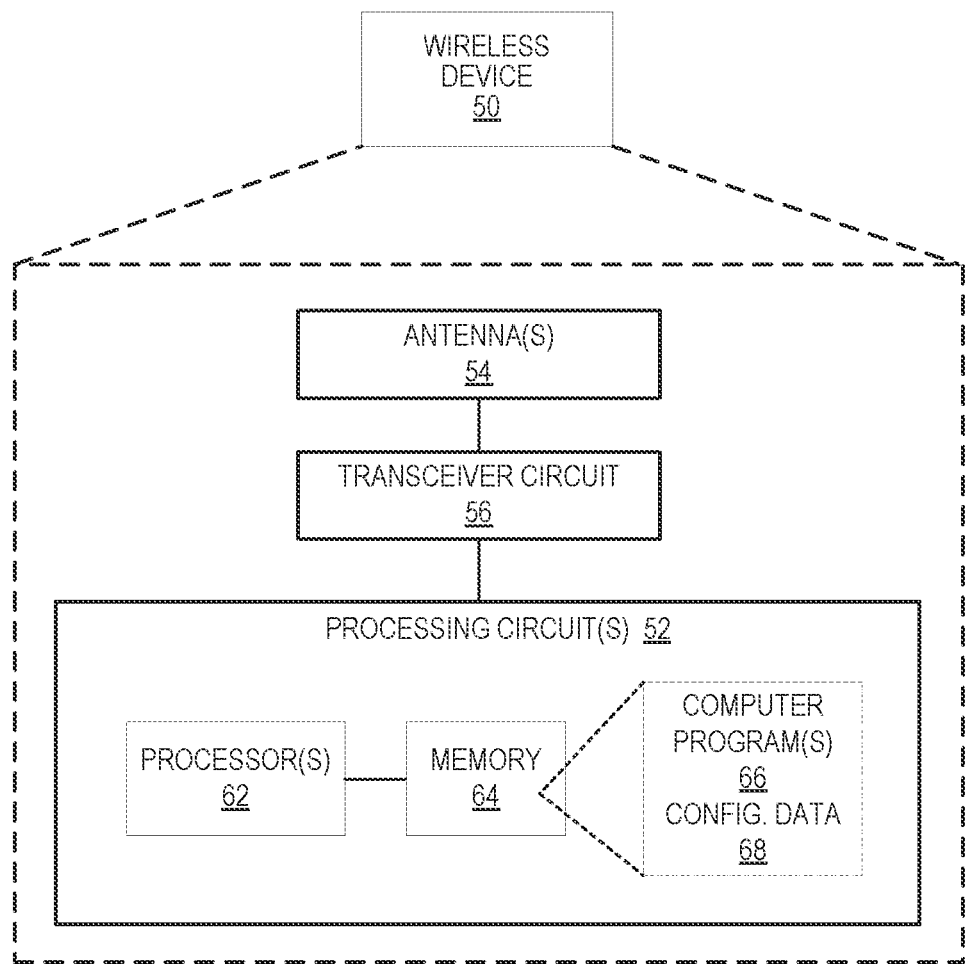
FIG. 8 is a block diagram of a user equipment, according to some embodiments.

FIG. 8 illustrates a diagram of an example wireless device 50 that is configured according to the teachings herein. The wireless device 50 comprises essentially any type of device or apparatus having wireless communication capability and configured for operation in a wireless communication network 20 of the types at issue in this disclosure.

The wireless device 50 communicates with a radio node or base station, such as the network access ode 30, via antennas 54 and transceiver circuitry 56. The transceiver circuitry 56 may include transmitter circuitry, receiver circuitry and associated control circuits that are collectively configured to transmit end receive signals according to one or more radio access technologies (RATs).

The wireless device 50 also includes processing circuitry 52 that is operatively associated with the transceiver circuitry 56. In one or more embodiments, the processing circuitry 52 comprises one or more digital processing circuits, e.g., one or more microprocessors, microcontrollers, DSPs, FPGAs, CPLDs, ASICs, or any mix thereof. More generally, the processing circuitry 52 may comprise fixed circuitry, or programmable circuitry that is specially adapted via the execution of program instructions implementing the functionality taught herein, or may comprise some mix of fixed and programmed circuitry. The processing circuitry 52 may be multi-core.

The processing circuitry 52 in the example embodiment also includes or is associated with memory 64. The memory 64, in some embodiments, stores one or computer programs 66 and, optionally, configuration data 68. The memory 64 provides non-transitory storage for the computer program 66, and it may comprise one or more types of computer-readable media, such as disk storage, solid-state memory storage, or any mix thereof. By way of example, the memory 64 comprises any one or more of SRAM, DRAM, EEPROM, and FLASH memory, which may be in the processing circuitry 52 and/or separate from processing circuitry 52. In general, the memory 64 comprises one or more types of computer-readable storage media providing non-transitory storage of the computer program 66 and any configuration data 68 used by the wireless device 50.

In some embodiments, the processor 62 of the processing circuitry 52 may execute a computer program 66 stored in the memory 64 that configures the processor 62 to operate as detailed herein.

With FIG. 8 in mind as a non-limiting example, a wireless device 50 is configured for operation in a wireless communication network 20. The example wireless device 50 includes transceiver circuitry 56 for receiving signals from transmission points 30 in the wireless communication network 20, and processing circuitry 52 that is operatively associated with the transceiver circuitry 56.

The processing circuitry 52 is configured to determine a set of synchronization signals used by a transmission point 30. Each synchronization signal in the set is associated with a different directional beam used by the transmission point 30 in antenna beamforming, and the transmission point 30 uses two or more directional beams.

Further, the processing circuitry 52 is configured to maintain synchronization of the wireless device 50 with the transmission point 30 in conjunction with moving between coverage areas corresponding to the two or more directional beams, based on dynamically synchronizing or resynchronizing with detected ones of the synchronization signals in the set. In the same or at least one further embodiment, in instances where two or more of the synchronization signals in the set of synchronization signals are detected, the processing circuitry 52 is configured to select a strongest or highest-quality one of the two or more detected synchronization signals, for synchronization. In this way the wireless device may autonomously maintain synchronization with the transmission point 30.

In at least some embodiments, the processing circuitry 52 is configured to determine the set of synchronization signals based on receiving assistance information that identifies the set of synchronization signals, or provides information enabling the wireless device 50 to identify the set of synchronization signals. For example, the transmission point 30 transmits the assistance information, which is received by the processing circuitry 52 via the transceiver 56.

In an example scenario, the transmission point 30 comprises a first one of neighboring first and second transmission points 30-1 and 30-2 in the wireless communication network 20. Correspondingly, the processing circuitry 52 is configured to detect one or more synchronization signals comprising a set of synchronization signals associated with the second transmission point 30-2, and change over from using the first transmission point 30-1 as the synchronization source for the wireless device 50 to using the second transmission point 30-2 as the synchronization source for the wireless device 50-2, based on determining that a radio quality determined by the wireless device 50 for one or more synchronization signals detected from the second transmission point 30-2 is higher than a radio quality determined by the wireless device 50 for any detected synchronization signal from the first transmission point 30-1. In this way the the update of the set of synchronization signals to be considered as a synchronization source can be done autonomously by the wireless device Still further, in one embodiments, the processing circuitry 52 is configured to determine, based on receiving information from the wireless communication network 20, the downlink resources used for transmitting each synchronization signal for the corresponding directional beam. Also, as noted, the set of synchronization signals may comprise a set of Mobility Reference Signals, MRSs, each MRS comprising a Time Synchronization Signal, TSS, and a Beam Reference Signal, BRS, and each BRS being unique within the set of MRSs, and further wherein each MRS is associated with a different one of the two or more directional beams used by the transmission point in antenna beamforming.

Figure 9:
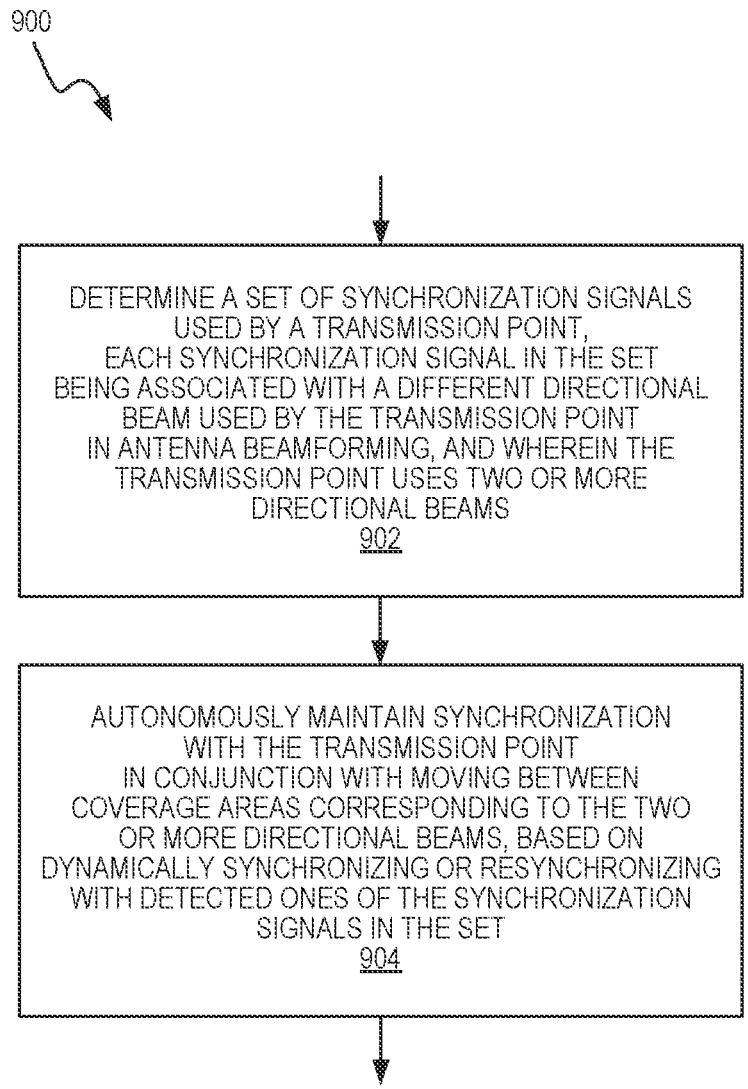
FIG. 9 illustrates a method of operation in a wireless communication network, according to some embodiments.

FIG. 9 illustrates one embodiment of a method 900 of processing implemented by a wireless device 50, such as the example wireless device 50 depicted in FIG. 8. However, the method 800 may be carried out by wireless devices having circuitry arrangements different than those illustrated in FIG. 8.

The method 900 includes the wireless device 50 determining (Mock 902) a set of synchronization signals used by a transmission point 30. In some embodiments, each synchronization signal in the set may be associated with a different directional beam used by the transmission point 30 in antenna beamforming, and where the transmission point 30 uses two or more directional beams.

The method 900 further includes the wireless device 50 maintaining synchronization with the transmission point 30 in conjunction with moving between coverage areas corresponding to the two or more directional bearers. Such operations include dynamically synchronizing or resynchronizing with detected ones of the synchronization signals in the set. The method 900 may further include, in instances where two or more of the synchronization signals in the set of synchronization signals are detected, selecting a strongest or highest-quality one of the two or more detected synchronization signals, for synchronization. In this way the wireless device may autonomously maintain synchronization with the transmission point 30.

The method 900 may further include determining at least one of the following, based on the wireless device 50 receiving information from the wireless communication network 20: the set of synchronization signals, and the particular downlink resources used for transmitting each synchronization signal for the corresponding directional beams. For example, the wireless device 50 updates or changes the set of synchronization signals that it attempts to detect for synchronization, based on at least one of an autonomous decision by the wireless device 50 and initiation by the wireless communication network.

Figure 10:
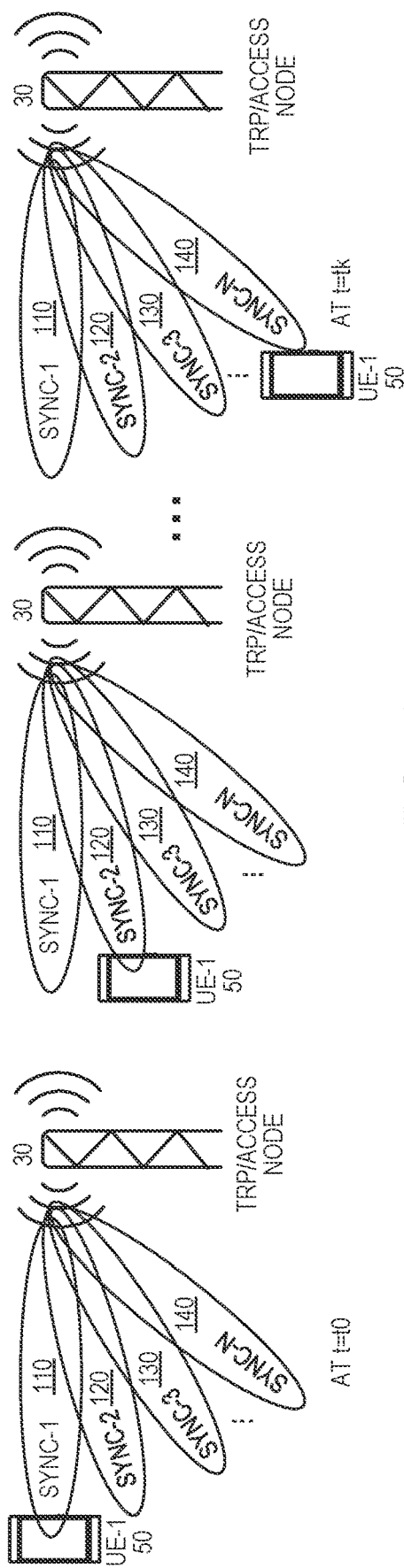
FIG. 10 is a diagram illustrating a user equipment that considers itself synchronized with the source at different times using different sets of sequences, according to some embodiments.

FIG. 10 is a diagram illustrating a wireless device 50 that considers itself synchronized with the source at different times (t0, t1, and tk) using different sets of sequences 110, 120, 130 and 140. These multiple sets of sequences 110-140 can be beamformed in different directions. The sets of sequences, for example in the case of analog/hybrid beamforming, can rely on a beam sweeping procedure to be possibly detected by wireless devices 50 in multiple directions.

In the example of FIG. 10, the wireless device 50 determines that it will use a first synchronization sequence 110 at time t0. The wireless device 50 later determines that it will use a second synchronization sequence 120 at time t1 and a third synchronization sequence 140 at time tk.

The number of sets of synchronization sequences (i.e., MRSs) may vary from one access node to another in order to enable the network to configure beam sweeping differently (periodicity, repetition factor of each MRS per sweep, number of MRSs per sweep, etc.) for different access nodes or transmission points and/or network deployments. Therefore, in some cases, the wireless device 50 may use two sets while in other cases it may use three sets or more.

Figure 11:
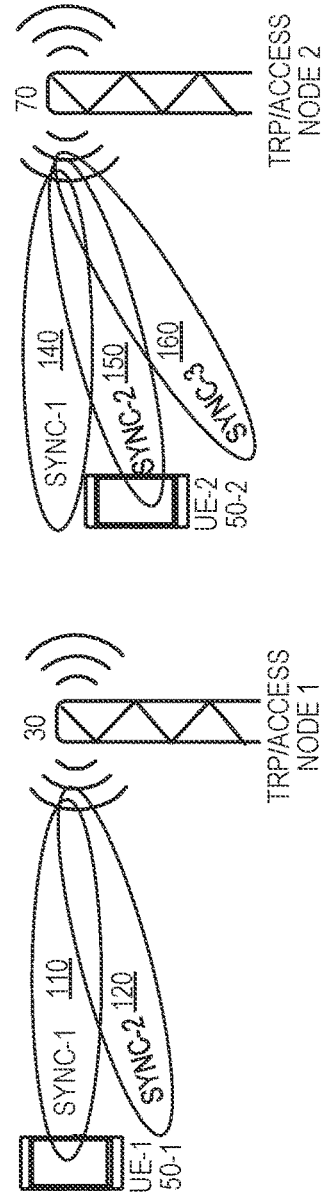
FIG. 11 is a diagram illustrating various numbers of sets of synchronization signals to be used as a synchronization source, according to some embodiments.

Accordingly, FIG. 11 is a diagram illustrating that the number of synchronization signals to be used as a synchronization source can vary from one network node 30 to another. The network node 30-1 transmits two synchronization signals 110 and 120, e.g., one in each beam used by the network node 30-1 in antenna beamforming. However, the network node 30-2 transmits three synchronization signals 140, 150, 160, e.g., one in each beam used by the network node 30-2 in antenna beamforming. Thus, the wireless device 50-1 may use one or both of the synchronization signals 110 and 120 as its synchronization source, while the wireless device 50-2 may use any one or more of the synchronization signals 140, 150, and 160 as its synchronization source. These multiple synchronization signals can be transmitted periodically per beam sweeping cycle or based on other triggering criteria identified by involved nodes 30, or a supporting node 22 in the network 20, e.g., based on the uplink quality.

In some embodiments, the synchronization signals are configured either as periodic signals, for that source synchronization purpose, or as aperiodic signals so that the network 20 detects when wireless devices 50 need to re-synchronize with their source nodes 30.

In some embodiments, a wireless device 50 receives information from the network 20 indicating the synchronization signals that it should use as synchronization sources e.g., it receives information indicating one or more sets of synchronization signals used by one or more transmission points 30 in the network 20. Such information is helpful because the wireless device 50 may autonomously detect multiple synchronization signals but not know the associations between synchronization signals and corresponding beams, nor necessarily know which synchronization signals are preferred.

Consider a transmission point 30 that beamforms according to a given set of beams, with each beam associated with a respective synchronization signal in a corresponding set of synchronization signals. Indicating the set of synchronization signals to the wireless device 50 allows it to recognize any of the beams in the beamforming set, and to maintain synchronization with the transmission point 30 as it moves within the coverage areas of the respective beams. Extending this example, the wireless device 50 could be in the coverage areas of multiple transmission points 30, each of them using respective sets of beams and corresponding sets of synchronization signals, e.g., MRSs, for beam differentiation. Of course, a given transmission point 30 may use multiple sets of beams, with each beam set having a corresponding set of synchronization signals. Further, a transmission point 30 may indicate a subset or restricted set of synchronization signals to be used by a wireless device 50 for obtaining or maintaining synchronization with the transmission point 30. Any or all such information may be regarded as "assistance" information that mar be signaled or otherwise indicated to wireless devices 50 operating in the network 20.

The wireless device 50 may obtain such information from system information broadcasted within the same coverage area but not necessarily by the transmission point 30 that is or will serve as the synchronization source for the wireless device 50. This operation may occur before initial access or when the wireless device 50 is in Idle mode, such as before a transition to Connected mode. Alternatively, the wireless device 50 may be explicitly configured with the particular synchronization signals, e.g., set or sets, to be used, via dedicated signaling. This approach presumes that the wireless device 50 obtains its source synchronization set once it is in Connected mode.

In other cases, the wireless device 50 derives, deduces, or otherwise infers the synchronization signals to be used for source synchronization, based on detecting an identifier, such as a Cell ID, System Information Index (SS), System Signature (SS), etc. In these cases, the mapping between the ID and the synchronization signals to be used could either be defined in the standards or other vise obtained by the wireless device 50, e.g., based on such information being transmitted in an Access information Table, AIT. Note that the "mapping" in such embodiments may be a mapping between IDs and synchronization-signal sequences, or sets of sequences.

The synchronization signals can be transmitted either in a fixed part of the spectrum, e.g., in the central N resource blocks of a given frequency band, or in a more flexible manner, e.g., in one of the possible parts of the band. In the flexible case, the wireless device 50 can derive the tier e-frequency resources, or where to look for the set of synchronization sequences, from another identifier the wireless device 50 can detect, such as a Cell ID, SS, etc. This implementation approach allows the transmission point 30 to flexibly change the number of sequences it uses, e.g., responsive to changing its beamforming configuration.

The wireless device 50 in some embodiments may be configured to receive, and the network 20 configured to send, detailed configuration information regarding the synchronization signals to be used by the wireless device 50 for synchronization and/or radio measurements. For example, the wireless device 50 can be informed of whether the synchronization signals in question are transmitted periodically or aperiodically. In the case that they are periodic, the wireless device 50 can be informed of the periodicity regarding subframes, frames, OFDM symbols, or any other time measure known by the wireless device 50. In the case that the synchronization signals are aperiodic, the wireless device 50 can be configured with some mechanism to trigger their transmission, or to be told when they are transmitted. The wireless device 50 can also be informed about the time/frequency resources these sets are transmitted. For example, the resource elements might be expected in the center of a given frequency carrier r other pails of the spectrum.

In some embodiments, the wireless device 50 may be updated with a new set of synchronization signals to use for source synchronization. The update can be triggered by the network or self-triggered by the device, such as upon the detection of a new identifier with stronger radio conditions or by an update in system information configuration within the same coverage area.

These updates may be triggered in at least two scenarios. The first scenario occurs when the network 20 decides to use a different set of signals (e.g., MRSs). That can occur in the case when the network 20 decides that, for the transmission point 30 transmitting for the involved wireless device 50, more synchronization signals will be defined and transmitted. For instance, more synchronization signals are defined in order to transmit narrower beams from a time T0 to a time T1.

If more synchronization signals are transmitted, but the previous ones are still being transmitted, the network 20 may either update the wireless device 50 or not update the wireless device 50. In other words, if the transmission point 30 serving as the synchronization source for the wireless device 50 reconfigures its antenna beamforming to use additional beans and begins transmitting additional synchronization signals for the added beams but continues transmitting the prior synchronization signals, the network 20 does not necessarily need to tell the wireless device 50 about the added synchronization signals.

The network 20 may also decide to reduce the number of synchronization signals in given transmission point. In that case, the wireless device 50 can be informed so that it does not trigger failure procedures. The second scenario occurs when the wireless device 50 is in Idle mode and is configured to obtain synchronization with a given set of synchronization signals. In that case, mobility is device-based, i.e., an autonomous procedure. Therefore, the update of the set of synchronization signals to be considered as a synchronization source can be done autonomously by the wireless device 50, based, for example, on the radio quality associated with received synchronization signals. It is also possible that the synchronization signals encode some notion of grouping that the wireless device 50 can detect.

The network 20 may also decide to update a configuration of the existing synchronization signals, such as the repetition per synchronization signal, the number of synchronization signals, the time/frequency resources, the periodicity at which the beam sweeps occur (i.e. DTX period between sweeps), etc.

In some embodiments, the network 20 can increase the periodicity for which the synchronization signals are transmitted, based on the fact that there is no data being scheduled to at least a subset of wireless devices 50. This approach can be applicable in the case that a Demodulation Reference Signal, DMRS, or other signals on downlink control channels, e.g., the Physical Downlink Control Channel, PDCCH, or the Packet Data Channel, PDCH, in the NR context, carry their synchronization signals, because in such cases wireless devices 50 can obtain synchronization as long as downlink data transmissions are being scheduled.

In some embodiments, the network 20 may adapt synchronization signal transmission as a function of the carrier frequencies or frequency bands involved. For example, the network 20 may be configured to transmit synchronization signals more often when higher carrier frequencies are being used, as compared to when, relatively speaking, lower carrier frequencies are being used. There may be a defined configuration parameter used by network nodes to determine whether or when to increase the frequency or repetition. In some cases, the wireless device 50 may be updated with a new set of synchronization signals even when the network is not changing its set.

The synchronization source may be updated during mobility. When a wireless device 50 knows its synchronization signal set, such as defined by a set of MRSs, the device 50 can distinguish these MRSs from other MRSs that do not belong to its set and treat the other MRSs as neighbor MRSs. The network 20 can use the neighbor MRSs as a new synchronization reference to be used by the wireless device 50 during a mobility execution procedure. The wireless device 50 uses the MRS indicated by the network as a synchronization source reference to send a PRACH preamble to another transmission point 30.

A second scenario where the update of the synchronization source, e.g., set of MRSs, may occur is when the wireless device 50 performs a mobility operation. Assuming that the wireless device 50 is configured with a set of MRSs denoted as MRS1, MRS2, MRS3, the device 50 may receive a handover command from its source transmission point 30 indicating that the device should use one or potentially multiple other MRSs, e.g. MRS4, MRS5, MRS6, as source synchronization signals or synchronization reference before a PRACH preamble is transmitted. In the case where a single MRS is indicated in the handover command, which could be in a Radio Resource Control, RRC, Connection Re-configuration message, the device 50 can be further updated by the new source access node with a set of MRSs to be used as the new synchronization source. Otherwise, in the case where multiple MRSs are given in the handover command, there could be an indication that the wireless device 50 should assume these as the new synchronization source.

Various embodiments described herein target the usage by wireless devices 50 in the Connected mode where the devices 50 can use one or multiple sets of synchronization sequences as their synchronization sources. However, some embodiments may be used in the Idle mode, or any kind of sleeping state where a wireless device 50 uses synchronization for initial access and paging monitoring. In other words, the device 50 could be moving across the coverage of one or multiple synchronization signals and not consider it as a "reselection" or consider the same system information parameters, e.g., PRACH configuration as still applicable. The configuration in that case will either occur via dedicated signaling when the device 50 was Connected or via system information.

In addition to ultra-lean qualities and beamforming, there may be decoupling between Idle and Connected mode connectivity. The decoupling may involve some transmission points 30 being configured to support only "RRC Connected" wireless devices 50. That is, some transmission points 30 should not be primarily used for initial access or device-based mobility. Similarly, other transmission points 30 may be configured to only support "RRC Idle" wireless devices 50 or both "RRC Idle" and "RRC Connected" wireless devices. Such configurations will affect the kind of signals and identifiers these nodes will transmit in these different configurations. "Idle" in this context, refers to the RRC Idle state but the meaning should be understood as extending to any kind of sleeping state where a wireless device 50 is optimized for battery savings. In LTE for example, Idle comprises procedures such as Suspend/Resume.

Assuming a decoupling between Idle and Connected mode connectivity as described, a wireless device 50 configured with a set of MRSs should not assume that this is the same synchronization signal to be used in Idle mode unless it is configured. In other words, a wireless device 50 is synchronized via a set of MRSs and moves to Idle mode. In that state, the wireless device 50 should search for new signals to obtain synchronization where the new signal(s) can also be one or multiple signals, according to some of the techniques described above.

In LTE, a base station broadcasts a pair of sequences, e.g., PSS and SSS, in omnidirectional fashion, for use as a synchronization source. However, it is contemplated herein that a transmission point 30 transmits two or more synchronization signals on a beam-specific basis, such that the transmission point 30 transmits a synchronization signal corresponding to each directional beam, among two or more directional beams used by the transmission point 30 in beamforming. Any one or more such synchronization signals are, therefore, valid synchronization sequences with respect to the transmission point 30, and a wireless device 50 maintains synchronization so long as it receives at least one them sufficiently good reception.

An advantage of the some of the techniques described above is that the usage of multiple sets of synchronization sequences/MRSs as the synchronization source means that a wireless device 50 does not need to update its synchronization source every time it detects a stronger beam. Also, the usage of multiple synchronization signals from a transmission point 30 simplifies the actions taken by a wireless device 50 upon detecting radio link problems, since it allows different implementations for quickly recovering lost synchronization.

Figure 12:
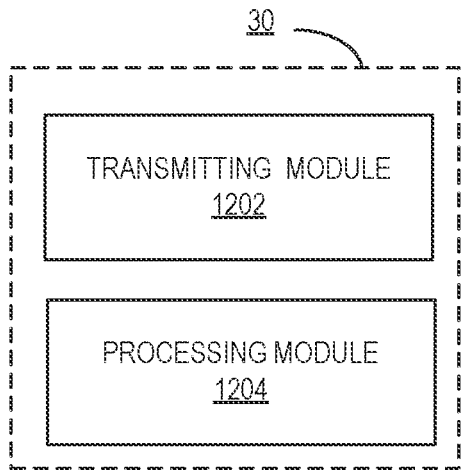
FIG. 12 is a block diagram illustrating a functional implementation of a network node, according to some embodiments.

FIG. 12 illustrates an example functional module or circuit architecture as may be implemented in a transmission point 30. The illustrated embodiment at least functionally includes a transmitting module 1202 and a processing module 1204. The processing module 1204 is configured to transmit, the the transmitting module 1202, the two or more synchronization signals from the transmission point 30 on a beam-specific basis, such that each synchronization signal corresponds to a respective one among two or more directional beams used by the transmission point (30) in antenna beamforming. The synchronization signals serve as references for synchronization measurements by wireless devices 50, for obtaining or maintaining synchronization with the transmission point 30.

In some embodiments the processing module 1204 is configured to generate two or more synchronization signals, each synchronization signal being distinguishable from the other one or ones of the two or more synchronization signals. Further, the processing module 1204 is configured to transmit, the the transmitting module 1202, the two or more synchronization signals from the transmission point 30 on a beam-specific basis, such that each synchronization signal corresponds to a respective one among two or more directional beams used by the transmission point (30) in antenna beamforming. The synchronization signals serve as references for synchronization measurements by wireless devices 50, for obtaining or maintaining synchronization with the transmission point 30.

In some embodiments the processing module 1204 is configured to generate two or more synchronization signals wherein each synchronization signal belongs to a set of synchronization signals associated with the transmission point. Further, the processing module 1204 is configured to transmit, the the transmitting module 1202, the two or more synchronization signals from the transmission point 30 on a beam-specific basis, such that each synchronization signal corresponds to a respective one among two or more directional beams used by the transmission point (30) in antenna beamforming. The synchronization signals serve as references for synchronization measurements by wireless devices 50, for obtaining or maintaining synchronization with the transmission point 30

Figure 13:
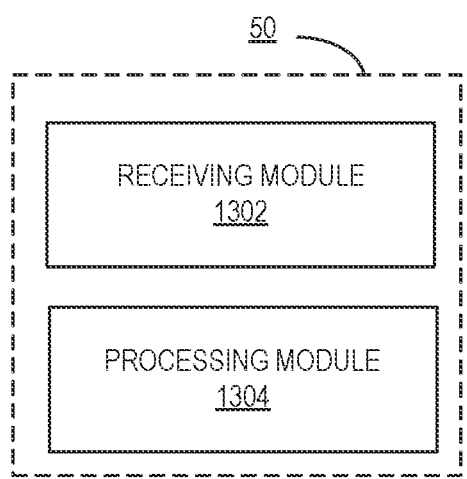
FIG. 13 is a block diagram illustrating a functional implementation of a wireless device, according to some embodiments.

FIG. 13 illustrates an example functional module or circuit architecture as may be implemented in a wireless device 50. The illustrated embodiment at least functionally includes a receiving module 1302 configured for receiving signals from transmission points 30 in a wireless communication network 20, along with a processing module 1304 configured for determining a set of synchronization signals used by a transmission point 30. In some embodimentseach synchronization signal in the set may be associated with a different directional beam used by the transmission point 30 in antenna beamforming, and the transmission point 30 uses two or more directional beams. The processing module 1304 is further configured for maintaining synchronization with the transmission point (30) in conjunction with moving between coverage areas corresponding to the two or more directional beams, based on dynamically synchronizing or resynchronizing with detected ones of the synchronization signals in the set. In this way the wireless device may autonomously maintain synchronization with the transmission point 30.

With the above examples in mind, in some contemplated embodiments, the availability of multiple sets of synchronization sequences/MRSs allows for different implementations, for a wireless device 50 to regain synchronization with its source. The procedure may be triggered when the wireless device 50 detects a radio link problem, such as when it is not able to decode downlink control channels.

In some embodiments, re-synchronization may occur in response to the detection of a radio link problem. Assuming that the wireless device 50 has been configured with a set of MRSs (or any other set of synchronization signals) to be used as the synchronization source, the wireless device 50 can use the configured resources in different ways.

In some embodiments, the wireless device 50 may detect a radio link problem when it is not able to decode downlink control channels, such as PDDCH and PDCH as described in the context of NR. The detection can be done by counting the number of out-of-sync events similarly to LTE. In an example case where the wireless device 50 has been configured with MRS1, MRS2, and MRS3, any of the three can be used as a synchronization source from the network perspective. In one embodiment, upon reaching a certain number (N310-nr) of out-of-sync packets, the wireless device 50 tries to regain synchronization with its previous source access node, randomly selecting one of the configured MRSs (MRS1, MRS2 or MRS3). In another embodiment, the wireless device 50 may use the first out of the configured set of MRSs that the wireless device 50 can detect. In another embodiment, the wireless device 50 selects the strongest MRS that it has measured out MRS1, MRS2, and MRS3 and starts to count the number of in-sync packets. If the number is not increasing, and at the same time the number of out-of-sync continues to grow, the wireless device 50 can use the second strongest MRS out of MRS1, MRS2, and MRS3.

The wireless device 50 may also use the multiple MRSs in a smart way to avoid the overhead of detecting/measuring multiple MRSs. In one embodiment, especially applicable in the case of analogue beamforming MRSs are transmitted in different beams in a time multiplexed manner. This approach allows the wireless device 50 to refrain from decoding the rest of MRSs for synchronization as long as it detects one of the MRSs in a good enough manner. Here, "good enough" may be defined by a threshold. In other words, the wireless device 50 may only use one synchronization signal and, as long as this is above a certain threshold, it does not need to use the others so that processing can be saved. On the other hand, the wireless device 50 may start trying to detect the others in the case of dropped quality, movements, etc.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not e limited to the specific embodiments disclosed and that modifications and other embodiments are intended to be included within the scope of this disclosure. Although specific terms may be employed herein, they are used in a generic and descriptive sense only and not for purposes of limitation.

In some examples, an RRC CONNECTED NR UE may perform RRM measurements and RRC driven mobility using these measurements. In some instances, an RRC CONNECTED NR UE does not need to be informed about 'cells', but rather only about beams. For RRM Measurements in NR an LTE UE detects cells based on its PSS/SSS. An important property of these signals is that a neighbor cell to be detected does not need to be in-sync with the serving cell's signals. Secondly, the UE autonomously detects the neighbor cell IDs (PCI) from an acquired PSS/SSS, i.e., the network does not need to provide a neighbor cell list. UEs typically detect and measure neighbor cells by sampling a short time window (e.g., 5 ms) on the target frequency (which may be the same or different from serving) and search (possibly offline) for PSS/SSS occurrences within that sample. For each detected PSS/SSS, the UE can also perform a measurement using the CRS corresponding to the PCI. The result of that action is a list of neighbor cell IDs and corresponding measurement sample. The NR CONNECTED mode operation can rely substantially on beam forming. Besides the data- and control information, the reference signals also need to be beam-formed in order to enable a UE to detect, measure and report beams (rather than cells). One option would be to send both, cell- and beam-specific sync- and reference signals. If the latter are dependent on the former, a UE would first have to detect the cell (as in LTE) based on its PSS/SSS like signals and subsequently attempt to detect one or more dependent beam reference signals (BRS). However, if the cell specific PSS/SSS is not beam-formed while the BRS is, the difference in received power will make the simultaneous reception challenging for the UE. Alternatively, the eNB could send the same cell specific PSS/SSS repeatedly with a number of different BRSs. However, this would increase the overhead and make it more difficult to use the PSS/SSS as unambiguous timing reference.

In order to keep the UE complexity for detecting beams equally simple as detecting neighbor cells in LTE, the cell specific synchronization signals (PSS/SSS) may be replaced by beam specific synchronization signals. These signals should have similar properties to the PSS/SSS with the primary difference being that they are only used in CONNECTED mode, and that their time/frequency allocation is not hard-coded in the standard. As indicated by the name, the beam-specific reference signals are intended to be beam-formed, and the network could use the increased allocation flexibility to stagger multiple signals within a subframe (e.g., one per OFDM symbol) and to transmit in different frequency allocations. The ID revealed by this sync signal is a "beam ID" rather than a cell ID. The UE should be able to perform RRM measurements on these signals and, hence, the signals are denoted Mobility Reference Signal (MRS).

Whether several MRSs are beam-formed within a sector or whether a single MRS covers the entire sector depends on the network configuration and is transparent to the UE. For NR CONNECTED mode, cell specific cell and reference signals are replaced by beam-specific mobility reference signals. An RRC CONNECTED UE detects and measures individual beams based on these measurement reference signals. Even though a UE will typically detect several such MRSs originating from the same transmission point, there may be potential benefits in allowing the UE to identify groups of beams and possibly define it, as a "cell". In some examples an RRC CONNECTED UE might not identify groups of beams.

In LTE, the RRCConnectionReconfiguration with mobilityControlInfo comprises, in particular, the target cell ID. In order to execute the handover, the UE shall detect the PSS/SSS carrying that PCI and establish downlink sync with that signal. Due to beamforming, the coverage area of the synchronization signals becomes potentially smaller compared to the coverage area of a cell. An RRC based mobility upon each beam change should be avoided. Mobility across the beams originating from one transmission point and among the beams of tightly synchronized transmission points of the same network node should not require any RRC reconfigurations. To achieve this, the network configures the UE with a set of serving MRSs. If the UE's MRS-search reveals several MRS IDs listed in the "serving MRS set", it chooses the strongest one as timing reference. Provided that the transmitted MRSs are in tight sync, the network does not need to know which of the MRSs in the set the UE uses instantaneously.

Upon connection establishment and during RRC level mobility, the network configures the NR UE with a "set of serving MRSs" that are transmitted in tight synchronization and among which the UE may use any as timing reference. The UE is be able to distinguish beams from its serving and neighbor eNBs, e.g., to trigger mobility events and measurement reports. The serving MRSs can be used for that purpose so that every beam that is not in its serving MRS set is a neighbor MRS. The MRSs are not the only signal based on which the UE may maintain sync with the network. While the PSS/SSS-like MRS enables the UE to acquire initial sync, the demodulation reference signals (DM-RS) allow a UE to maintain accurate sync while receiving data. This is similar to LTE, where UEs may, e.g., use CRS to maintain sync even in between the PSS/SSS occasions. In addition to the "set of serving MRSs", the UE may use its DMRS for maintaining accurate time/frequency sync. In LTE, all physical channels are scrambled with the cell ID (which the UE acquired from the PSS/SSS). This scrambling ensures that UEs can distinguish transmissions of the serving cell from transmissions of the neighbor cells. Furthermore, the different scrambling sequences randomize the neighbor cells' interference. Since the MRS is beam specific, and since the chosen MRS within the "serving MRS set" should be transparent to the network, the MRS ID cannot be used for that scrambling. MRSs are only intended for operation in CONNECTED mode where the UE should operate in accordance with a dedicated RRC configuration. Hence, the scrambling ID to be used by RRC Connected UEs can be conveyed by dedicated signalling rather than derived from a synchronization signal. In some examples the scrambling ID to be used by RRC Connected UEs is conveyed by dedicated RRC signalling.

What is claimed is:
1. A method performed by a user equipment (UE), the method comprising:
    receiving from a gNB information indicating a set of different synchronization signals, wherein the synchronization signals serve as references for obtaining or maintaining synchronization with the gNB; and
    maintaining synchronization with the gNB in conjunction with moving between coverage areas corresponding to two or more beams, by dynamically synchronizing or resynchronizing with at least one of the synchroniza- tion signals in the set, wherein the UE does not trigger a radio link failure as long as synchronization can be obtained from the set.

2. The method of claim 1, wherein receving the information comprises the UE being explicitly configured with the set of synchronization signals via dedicated signalling.

3. The method of claim 1, further comprising:
receiving from the gNB, further information indicating a change to the set of synchronisation signals to use as synchronization sources.

4. The method of claim 1, further comprising determining, based on the received information from the gNB, the downlink resources used for receiving each synchronization signal of the set of synchronization signals.

5. A user equipment (UE) for operation in a wireless communication network, the UE configured to:
receive from a gNB information indicating a set of different synchronization signals for obtaining or maintaining synchronization with the gNB; and
maintain synchronization with the gNB in conjunction with moving between overage areas corresponding to two or more beams, by dynamically synchronizing resynchronizing with at least one of the synchronization signals in the set, wherein the UE does not trigger a radio link failure as long as synchronisation can be obtained from the set.

6. The UE of claim 5, wherein, to receive the information from the gNB, the UE is configured to be explicitly configured with the set of synchronization signals via dedicated signalling.

7. The UE of claim 5, wherein the UE is further configured to:
receive from the gNB, further information indicating a change to the set of synchronisation signals to use as synchronization sources.

8. The UE of claim 5 wherein the UE is further configured to determine, based on the received information from the gNB, the downlink resources used for receiving each synchronization signal of the set of synchronization signals.

9. A method performed by a gNB, the method comprising:
configuring a user equipment (UE) with a set of different synchronization signals for obtaining or maintaining synchronization with the gNB; and
transmitting the set of two or more synchronization signals such that each synchronization signal is different from one another and corresponds to a different beam from among two or more beams used by the gNB, and wherein the UE does not trigger a radio link failure as long as synchronisation can be obtained by the UE from the set of synchronisation signals.

10. The method of claim 9, further comprising:
generating the two or more synchronization signals, wherein the generating includes differentiating the two or more synchronization signals in terms of included information or signal properties, thereby enabling the UE to distinguish between the two or more synchronization signals.

11. The method of claim 9, further comprising:
indicating to the UE a change to the set of synchronisation signals to use as synchronization sources.

12. The method of claim 9, further comprising indicating to the UE information to enable the UE to determine the downlink resources used for receiving each synchronization signal of the set of synchronization signals.

13. A gNB for operation in a wireless communication network, the gNB arranged to:
configure a user equipment (UE) with a set of different synchronization signals for obtaining or maintaining synchronization with the gNB; and
transmit the set of two or more synchronization signals such that each synchronization signal is different from one another and corresponds to a different beam from among two or more beams used by the gNB, and wherein the UE does not trigger a radio link failure as long as synchronisation can be obtained by the UE from the set of synchronisation signals.

* * * * *

UNITED STATES PATENT AND TRADEMARK OFFICE
CERTIFICATE OF CORRECTION

PATENT NO. : 11,570,733 B2
APPLICATION NO. : 17/157217
DATED : January 31, 2023
INVENTOR(S) : da Silva et al.

It is certified that error appears in the above-identified patent and that said Letters Patent is hereby corrected as shown below:

In the Specification

In Column 1, Line 8, delete "2019," and insert -- 2019, now U.S. Pat. No. 10,932,211, --, therefor.

In Column 1, Line 38, delete "from" and insert -- from a --, therefor.

In Column 1, Line 50, delete "PRAM," and insert -- PRACH, --, therefor.

In Column 1, Line 53, delete "e ency" and insert -- frequency --, therefor.

In Column 2, Line 45, delete "future," and insert -- future --, therefor.

In Column 4, Line 53, delete "beam s" and insert -- beam is --, therefor.

In Column 4, Line 64, delete "of with" and insert -- of MRSs, with --, therefor.

In Column 5, Line 23, delete "circuitry" and insert -- circuitry and --, therefor.

In Column 7, Line 33, delete "apsect," and insert -- aspect, --, therefor.

In Column 7, Line 37, delete "the t or re" and insert -- the two or more --, therefor.

In Column 7, Line 40, delete "embodiment" and insert -- embodiment, --, therefor.

In Column 7, Line 66, delete "e executed" and insert -- when executed --, therefor.

In Column 8, Line 18, delete "beamformin." and insert -- beamforming. --, therefor.

In Column 8, Line 36, delete "SS frame" and insert -- SSS frame --, therefor.

Signed and Sealed this
Second Day of April, 2024

*Katherine Kelly Vidal*
Katherine Kelly Vidal
*Director of the United States Patent and Trademark Office*

CERTIFICATE OF CORRECTION (continued)
U.S. Pat. No. 11,570,733 B2

In Column 8, Line 37, delete "case," and insert -- case. --, therefor.

In Column 8, Line 38, delete "SS frame" and insert -- SSS frame --, therefor.

In Column 9, Line 11, delete "heaps knowledge at a givers" and insert -- beam knowledge at a given --, therefor.

In Column 9, Line 22, delete "transmission two" and insert -- transmission of two --, therefor.

In Column 9, Line 41, delete "MRS." and insert -- BRS. --, therefor.

In Column 10, Line 18, delete "22 e.g.," and insert -- 22—e.g., --, therefor.

In Column 10, Line 19, delete "etc. that" and insert -- etc.—that --, therefor.

In Column 10, Line 29, delete "figure denoted" and insert -- figure—denoted --, therefor.

In Column 10, Line 34, delete "wherein" and insert -- wherein it --, therefor.

In Column 10, Line 35, delete "hearer" and insert -- beam --, therefor.

In Column 10, Line 46, delete "bearers" and insert -- beams --, therefor.

In Column 11, Line 51, delete "data." and insert -- data --, therefor.

In Column 12, Line 12, delete "in a a" and insert -- in antenna --, therefor.

In Column 12, Line 63, delete "embodiments i, or" and insert -- embodiment(s), or --, therefor.

In Column 13, Line 15, delete "beams," and insert -- beams. --, therefor.

In Column 13, Line 19, delete "car" and insert -- or --, therefor.

In Column 13, Line 27, delete "beam," and insert -- beam. --, therefor.

Figure 7:
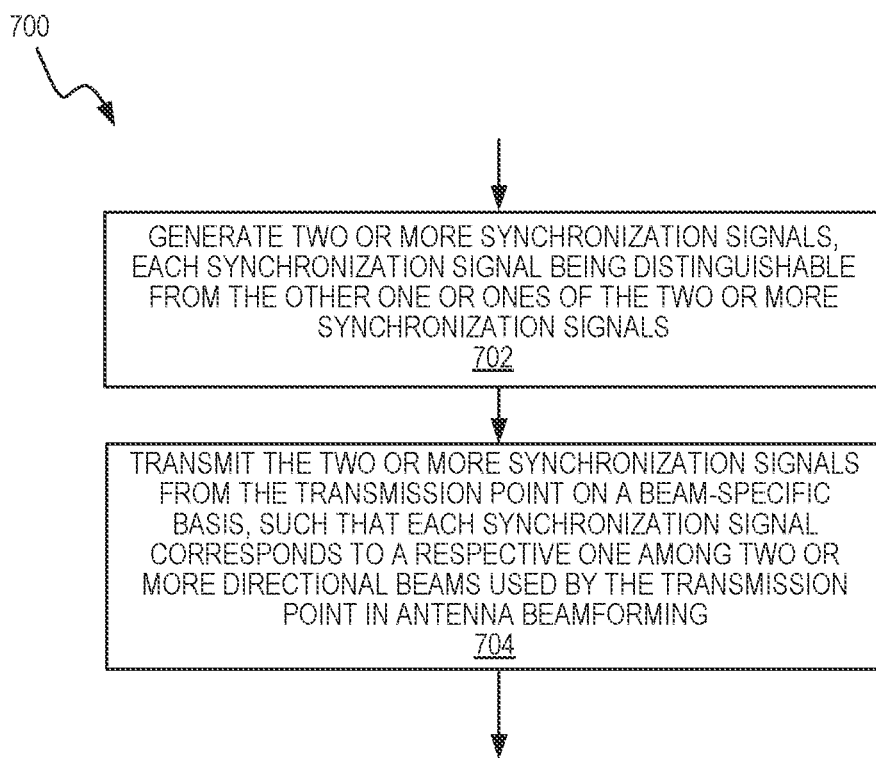
FIG. 7 illustrates a method of operation in a wireless communication network, according to some embodiments.

In Column 13, Line 32, delete "7" and insert -- FIG. 7 --, therefor.

In Column 13, Line 34, delete "30," and insert -- 30. --, therefor.

In Column 13, Line 66, delete "include" and insert -- may include --, therefor.

In Column 14, Line 32, delete "tunes," and insert -- times, --, therefor.

In Column 14, Line 50, delete "ode 30," and insert -- node 30, --, therefor.

In Column 14, Lines 52-53, delete "receiver circuitry" and insert -- receiver circuitry, --, therefor.

CERTIFICATE OF CORRECTION (continued)
U.S. Pat. No. 11,570,733 B2

In Column 14, Line 54, delete "end receive" and insert -- and receive --, therefor.

In Column 15, Line 2, delete "with memory" and insert -- with a memory --, therefor.

In Column 15, Line 3, delete "one or" and insert -- one or more --, therefor.

In Column 15, Line 8, delete "of example," and insert -- of non-limiting example, --, therefor.

In Column 16, Line 7, delete "one" and insert -- one or more --, therefor.

In Column 16, Line 27, delete "(Mock 902)" and insert -- (Block 902) --, therefor.

In Column 16, Line 36, delete "bearers." and insert -- beams. --, therefor.

In Column 17, Lines 37-38, delete "sources e.g.," and insert -- sources—e.g., --, therefor.

In Column 17, Line 65, delete "mar be" and insert -- may be --, therefor.

In Column 18, Line 19, delete "other vise" and insert -- otherwise --, therefor.

In Column 18, Line 21, delete "information" and insert -- Information --, therefor.

In Column 18, Lines 29-30, delete "tier e-frequency" and insert -- time-frequency --, therefor.

In Column 18, Line 53, delete "r other pails" and insert -- or other parts --, therefor.

In Column 19, Line 10, delete "beans and" and insert -- beams and --, therefor.

In Column 19, Line 17, delete "signals in" and insert -- signals in a --, therefor.

In Column 20, Line 46, delete "context," and insert -- context --, therefor.

In Column 21, Line 7, delete "sufficiently" and insert -- with sufficiently --, therefor.

In Column 22, Line 42, delete "out MRS1," and insert -- out of MRS1, --, therefor.

In Column 22, Line 51, delete "beamforming" and insert -- beamforming (BF), --, therefor.

In Column 22, Line 66, delete "not e" and insert -- not to be --, therefor.

In Column 24, Line 1, delete "define it," and insert -- define it --, therefor.

In the Claims

In Column 24, Line 66, Claim 1, delete "two" and insert -- the two --, therefor.

In Column 25, Line 21, in Claim 5, delete "overage" and insert -- coverage --, therefor.

In Column 25, Line 22, in Claim 5, delete "two" and insert -- the two --, therefor.

In Column 25, Line 22, in Claim 5, delete "synchronizing" and insert -- synchronizing or --, therefor.

In Column 25, Line 36, in Claim 8, delete "claim 5" and insert -- claim 5, --, therefor.